(12) United States Patent
Kitazato

(10) Patent No.: US 9,998,798 B2
(45) Date of Patent: Jun. 12, 2018

(54) RECEPTION DEVICE, RECEPTION METHOD, TRANSMISSION DEVICE, AND TRANSMISSION METHOD

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days. days.

(21) Appl. No.: 15/023,500

(22) PCT Filed: Oct. 10, 2014

(86) PCT No.: PCT/JP2014/077211
§ 371 (c)(1),
(2) Date: Mar. 21, 2016

(87) PCT Pub. No.: WO2015/060148
PCT Pub. Date: Apr. 30, 2015

(65) Prior Publication Data
US 2016/0241923 A1 Aug. 18, 2016

(30) Foreign Application Priority Data
Oct. 25, 2013 (JP) .................................. 2013-221865

(51) Int. Cl.
*H04N 7/173* (2011.01)
*H04N 21/61* (2011.01)
(Continued)

(52) U.S. Cl.
CPC ........ *H04N 21/6125* (2013.01); *H04H 20/28* (2013.01); *H04H 20/95* (2013.01);
(Continued)

(58) Field of Classification Search
CPC ............. H04N 21/6125; H04N 21/845; H04N 21/6175; H04N 21/64707; H04N 21/4622
See application file for complete search history.

(56) References Cited

U.S. PATENT DOCUMENTS

2010/0195633 A1* 8/2010 Vare .................... H04W 36/385
370/338
2010/0242067 A1* 9/2010 Song ...................... H04H 20/67
725/51

(Continued)

FOREIGN PATENT DOCUMENTS

| JP | 2001-053697 | 2/2001 |
|---|---|---|
| JP | 2009-505557 | 2/2009 |
| JP | 2012-156712 | 8/2012 |

OTHER PUBLICATIONS

"Content Download System for Digital Broadcasting", Association of Radio Industries and Businesses, Jul. 3, 2012, Chapter 6, pp. 1-9.

(Continued)

*Primary Examiner* — John Schnurr
(74) *Attorney, Agent, or Firm* — Oblon, McClelland, Maier & Neustadt, L.L.P.

(57) ABSTRACT

The present technique relates to a reception device, a reception method, a transmission device, and a transmission method, capable of flexibly supporting various operation modes. A service package unit processes, on a per-service basis, using an IP address included in each of packets, a particular service and a shared service related to the particular service, among a plurality of services transmitted via a broadcast wave of digital broadcasting using an IP transmission scheme. Accordingly, it is possible to flexibly support various operation modes in the digital broadcasting using the IP transmission scheme. It would be possible, for example, to apply the present technique to a television receiver.

20 Claims, 28 Drawing Sheets

(51) Int. Cl.
*H04H 20/28* (2008.01)
*H04N 21/2362* (2011.01)
*H04N 21/434* (2011.01)
*H04N 21/438* (2011.01)
*H04H 20/95* (2008.01)
*H04H 40/27* (2008.01)
*H04H 60/72* (2008.01)
*H04N 21/643* (2011.01)
*H04N 21/845* (2011.01)
*H04N 21/462* (2011.01)

(52) U.S. Cl.
CPC ............ *H04H 40/27* (2013.01); *H04H 60/72* (2013.01); *H04N 21/2362* (2013.01); *H04N 21/434* (2013.01); *H04N 21/438* (2013.01); *H04N 21/4622* (2013.01); *H04N 21/6175* (2013.01); *H04N 21/64322* (2013.01); *H04N 21/845* (2013.01)

(56) References Cited

U.S. PATENT DOCUMENTS

2010/0281501 A1* 11/2010 Paavola ................ H04H 60/72
725/39

2013/0034032 A1   2/2013 Vare et al.
2013/0219431 A1*  8/2013 Hong ..................... H04H 20/42
725/54

OTHER PUBLICATIONS

Extended Search Report dated Feb. 22, 2017 in European Patent Application No. 14856020.4.
DVB Organization: Draft review of DVB-NGh requirements against DVB-T2 Lite and DVB-NGH, "CM-NGH0019r3_NGH_T2-lite_ vs_ NGHCRs.pdf" DVB, Digital Video Broadcasting, Oct. 2012, XP017839557A, 8 pages.
ATSC Advanced Television Systems committee, ATSC Recommended Practice: Guide to the ATSC Mobile DTV Standard, Advanced Television Systems Committee, XP17846702A, Jan. 2013, 88 pages.
Sung Oh Hwang, et al., "MMT over DVB-T2 CE Participants", Guidelines on how to provide MMT transport over Broadcasting Network, Apr. 2014, XP030058054A, 9 pages.
Dvb Organization: gbs0689, "Signalling—Solution-For NGH-IP-Profile", TM-H-TF-SUL, TM-GBS meeting, V11.ppt, 2011, XP017833427A, 14 pages.

* cited by examiner

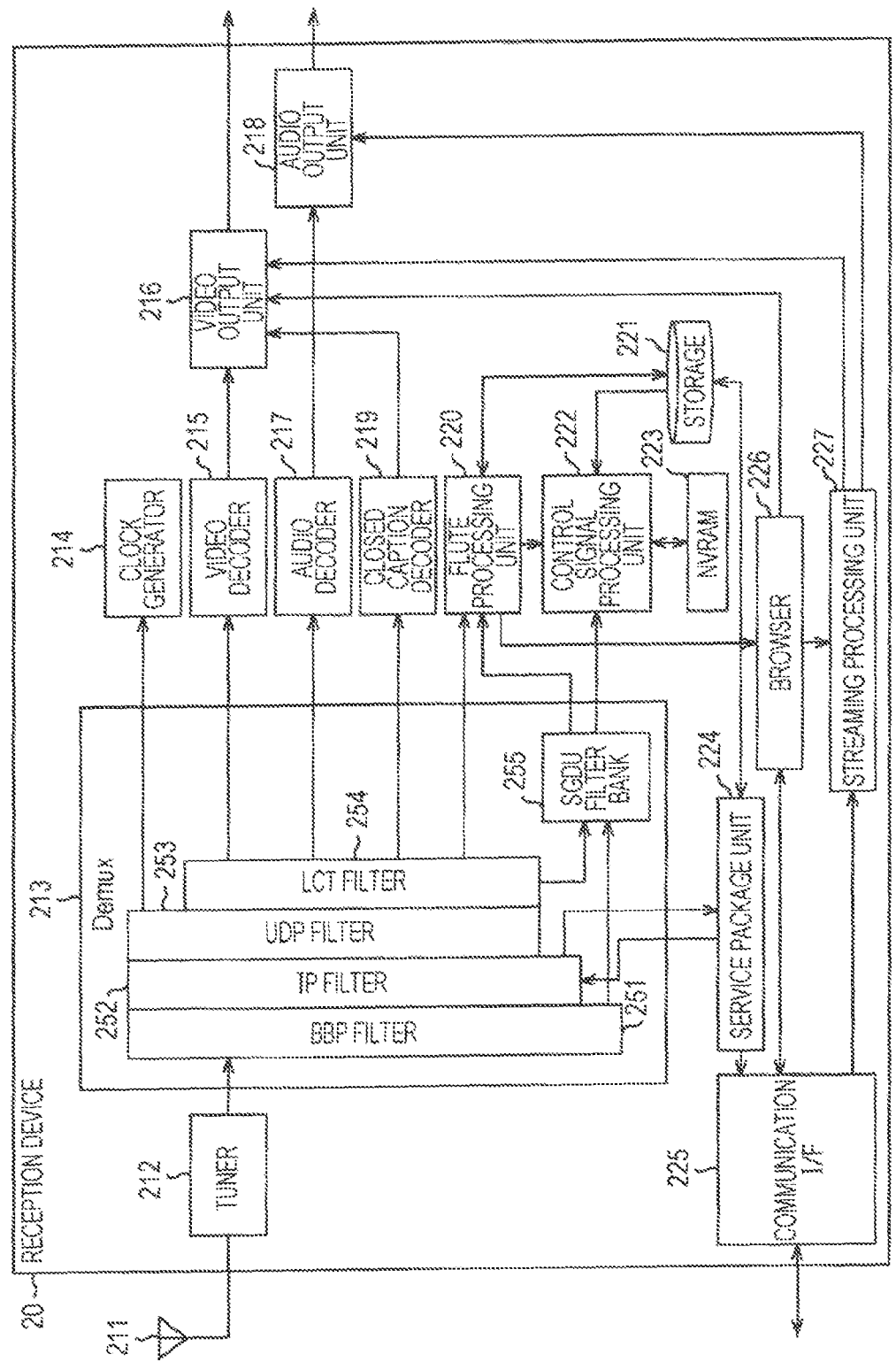

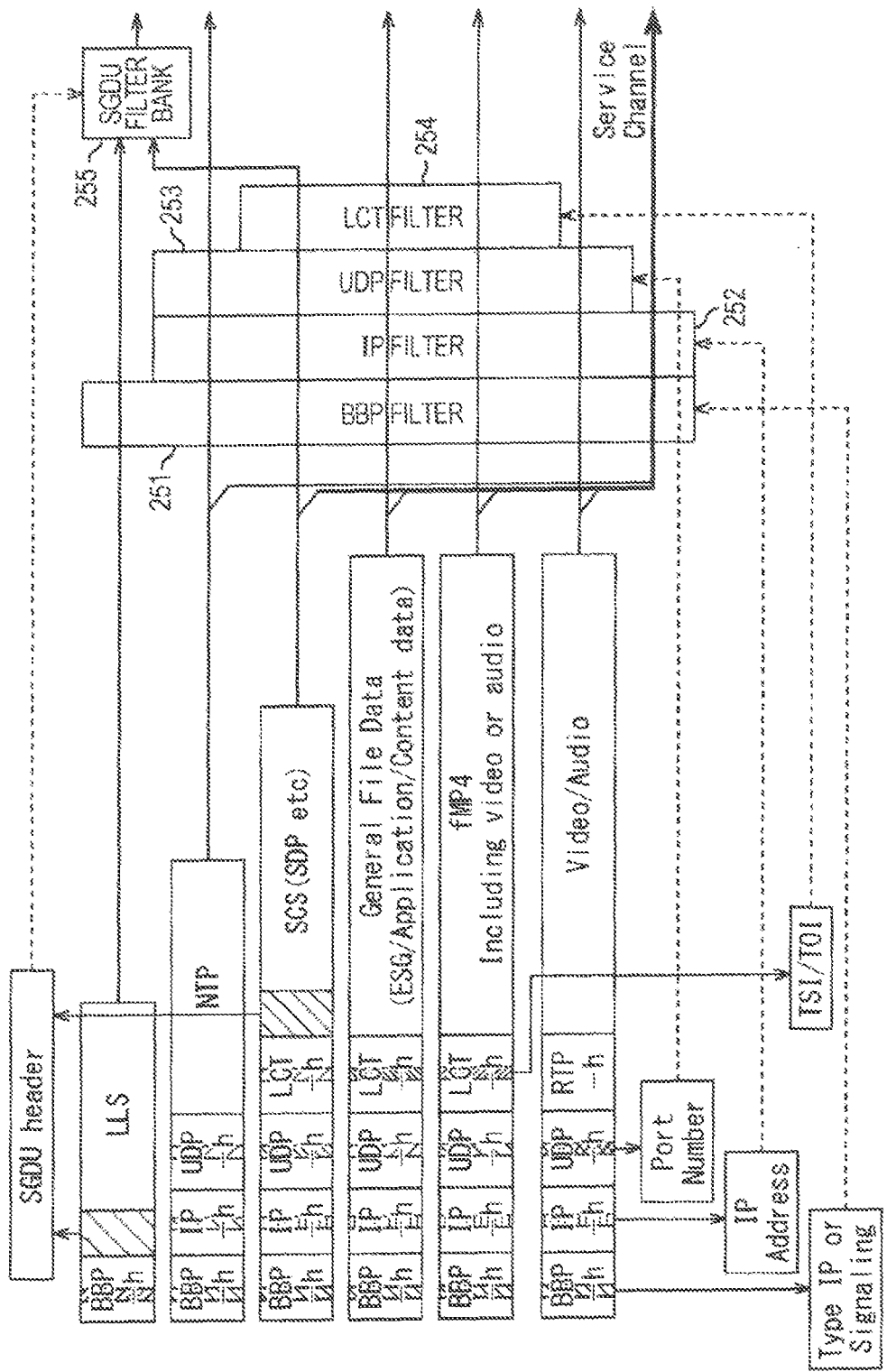

FIG. 14

| ELEMENT/ATTRIBUTE | APPEARANCE NUMBER | DEFINITION |
|---|---|---|
| sct | 1 | SERVICE CONFIGURATION TABLE |
| @networkId | 1 | NETWORK IDENTIFIER BROADCASTER IDENTIFIER ON A PER-Physical-Channel BASIS |
| @name | 0..1 | BROADCASTER NAME ON A PER-Physical-Channel BASIS |
| BBPStream | 1..n | BBP Stream |
| @BBPstreamId | 1 | BBP STREAM IDENTIFIER |
| @payloadType | 1 | BBP PAYLOAD TYPE "ipv4", "ipv6", "ts" |
| @name | 0..1 | BBP Stream NAME |
| ESGBootstrap | 0..1 | ESG ACCESS INFORMATION |
| @sourceIPAddress | 1 | SOURCE IP ADDRESS FOR TRANSMISSION OF ESG |
| @destinationIPAddress | 1 | DESTINATION IP ADDRESS FOR TRANSMISSION OF ESG |
| @portNum | 1 | PORT NUMBER FOR TRANSMISSION OF ESG |
| @tsi | 1 | FLUTE Session TSI FOR TRANSMISSION OF ESG |
| Service | 1 | SERVICE |
| @serviceId | 1 | SERVICE IDENTIFIER |
| @serviceType | 1 | SERVICE TYPE "tv", "audio", "data", "nrt", "esg", "adjunct-nrt", "adjunct-shared" |
| SCSBootstrap | 1 | SERVICE CHANNEL ACCESS INFORMATION |
| @sourceIPAddress | 1 | SOURCE IP ADDRESS FOR TRANSMISSION OF SERVICE |
| @destinationIPAddress | 1 | DESTINATION IP ADDRESS FOR TRANSMISSION OF SERVICE |
| @portNum | 1 | PORT NUMBER FOR TRANSMISSION OF SCS |
| @tsi | 1 | FLUTE Session TSI FOR TRANSMISSION OF SCS |
| AdjunctService | 0..n | RELATED ADJUNCT SERVICE |
| @networkId | 0..1 | NETWORK IDENTIFIER |
| @BBPStreamId | 0..1 | BBP STREAM IDENTIFIER |
| @serviceId | 1 | SERVICE IDENTIFIER |
| @serviceType | 1 | SERVICE TYPE "adjunct-nrt", "adjunct-shared" |

FIG. 15

SAT

| ELEMENT/ATTRIBUTE | | | APPEARANCE NUMBER | DEFINITION |
|---|---|---|---|---|
| Sat | | | 1 | SERVICE ASSOCIATION TABLE |
| | Service | | 0..n | SERVICE ON AIR |
| | | @service_id | 1 | IDENTIFIER FOR SERVICE ON AIR |

FIG. 16

```
v=0
o=user123 2890844526 2890842807 IN IP4 43.123.123.123
s=RTP Session Example
c=IN IP4 224.0.0.10
a=service:100
a=adjunct_service:101
m=video 8000 RTP/AVP 96
a=rtpmap:96 H264/90000
m=audio 7000 RTP/AVP 99
```

FIG. 17

| Data Field Name | Data Type |
|---|---|
| Service_Guide_Delivery_Unit{ | |
|   Unit_Header{ | |
|     extension_offset | uimsbf32 |
|     reserved | 8bits |
|     n_o_service_guide_fragments | uimsbf24 |
|     for(i=0;i<n_o_service_guide_fragments;i++){ | |
|       fragmentTransposition[i] | uimsbf32 |
|       fragmentVersion[i] | uimsbf32 |
|       offset[i] | uimsbf32 |
|     } | |
|   } | |
|   Unit_Payload{ | |
|     for(i=0;i<n_o_service_guide_fragments;i++){ | |
|       fragmentEncoding[i] | uimsbf8 |
|       if(fragmentEncoding[i]=0){ | |
|         fragmentType | uimsbf8 |
|         XMLFragment | bytestring |
|       } | |
|       else if(fragmentEncoding[i]=1){ | |
|         validFrom | uimsbf32 |
|         validTo | uimsbf32 |
|         fragmentID | bytestring |
|         SDPfragment | bytestring |
|       } | |
|     } | |
|   } | |
|   if(extension_offset>0){ | |
|     extension_type | uimsbf8 |
|     next_extension_offset | uimsbf32 |
|     extension_data | bytestring |
|   } | |
| } | |

RECEPTION DEVICE, RECEPTION METHOD, TRANSMISSION DEVICE, AND TRANSMISSION METHOD

TECHNICAL FIELD

The present technique is related to a reception device, a reception method, a transmission device, and a transmission method, particularly related to a reception device, a reception method, a transmission device, and a transmission method, capable of flexibly supporting various operation modes.

BACKGROUND ART

As a digital broadcasting standard in various countries, the Moving Picture Experts Group phase 2-Transport Stream (MPEG2-TS) system is adopted as a transmission format (refer to Patent Document 1, for example). In the future, by adopting an IP transmission scheme, in which an internet protocol (IP) packet presently used in a communication field is employed for digital broadcasting, it is expected that higher level services can be provided.

CITATION LIST

Patent Document

Patent Document 1: JP 2012-156712 A

SUMMARY OF THE INVENTION

Problems to be Solved by the Invention

By introducing the IP transmission scheme, it is expected that content with various formats can be transmitted to a variety of devices, leading to a possibility of utilizing various operation modes. Unfortunately, however, no technical scheme for supporting such an operation scheme has ever been established.

In view of this situation, the present technique is intended to make it possible to support various operation modes flexibly in digital broadcasting in which the IP transmission scheme has been introduced.

Solutions to Problems

A reception device according to a first aspect of the present technique includes a reception unit configured to receive a broadcast wave of digital broadcasting that uses an IP transmission scheme, a processing unit configured to process, on a per-service basis, a particular service and a shared service related to the particular service, among a plurality of services transmitted by the broadcast wave, by using an IP address included in each of packets.

The configuration may be such that each of the services includes one or more components, a first control signal at least including information regarding the component, and in a same service, a packet of the component and a packet of the first control signal have a same IP address.

The configuration may be such that the particular service includes one or more specific components and the first control signal, and that the shared service includes one or more shared components and the First control signal.

The configuration may be such that the processing unit uses an IP address contained in each of packets and packages constituents of the particular service and of the shared service.

The configuration may be such that the packet of time information used in common by a plurality of services has a particular IP address and that the processing unit uses the IP address contained in each of the packets and includes the time information in the package.

The configuration may be such that the packet of an electronic service guide has a particular IP address, and that the processing unit uses the IP address contained in each of the packets to include the electronic service guide in the package.

The configuration may be such that the first control signal is transmitted at a first layer that is a layer higher than an IP layer, among protocol layers in the IP transmission scheme.

The configuration may be such that the broadcast wave transmits a second control signal at a second layer that is a layer lower than the IP layer, and that the second control signal at least includes an ID for identifying a network, an ID for identifying a stream, and an ID for identifying a service.

The configuration may be such that the second control signal includes information for identifying the shared service.

The configuration may be such that the first control signal includes information for identifying the shared service.

The configuration may be such that the second control signal includes information indicating whether the particular service and the shared service are on the air.

The configuration may be such that the first control signal and the second control signal are stored in an SGDU container and transmitted.

A reception device according to the first aspect of the present technique may be a separate device or an internal block forming one device.

A reception method according to the first aspect of the present technique is a reception method that corresponds to the reception device according to the first aspect.

With the reception device and the reception method according to the first aspect of the present technique, a broadcast wave of digital broadcasting that uses an IP transmission scheme is received, a particular service and a shared service related to the particular service, among a plurality of services transmitted by the broadcast wave are processed, on a per-service basis, by using an IP address included in each of packets.

A transmission device according to a second aspect of the present technique includes a transmission unit configured to transmit a particular service and a shared service related to the particular service on a broadcast wave of digital broadcasting using the IP transmission scheme. The packet that transmits the particular service and the packet that transmits the shared service have a same IP address on a per-service basis.

The transmission device according to the second aspect of the present technique may be configured such that it further includes a first acquisition unit configured to obtain one or more components, and a second acquisition unit configured to obtain a control signal that at least includes information regarding the component, and a packet of the one or more component that forms the particular service or the shared service and a packet of the control signal have the same IP address on a per-service basis.

The transmission device according to the second aspect of the present technique may be a separate device or may be an internal block forming one device.

A transmission method according to the second aspect of the present technique is a transmission method that corresponds to the above-described transmission device according to the second aspect of the present technique.

With the transmission device and the transmission method according to the second aspect of the present technique, the broadcast wave of digital broadcasting using the IP transmission scheme is transmitted such that the packet that transmit the particular service and the packet that transmits the shared service related to the particular service have a same IP address on a per-service basis.

Effects of the Invention

According to the first aspect and the second aspect of the present technique, it is possible to flexibly support various operation modes.

Note that effects described herein are non-limiting. The effects may be any effects described in the present disclosure.

BRIEF DESCRIPTION OF DRAWINGS

FIG. 12 is a diagram illustrating a configuration according to an embodiment of a reception device to which the present technique is applied.

FIG. 13 is a diagram illustrating details of filtering processing for each of packets executed by Demux.

FIG. 14 is a diagram illustrating syntax of an SCT.

FIG. 15 is a diagram illustrating syntax of an SAT.

FIG. 16 is a diagram illustrating an exemplary description of an SDP.

FIG. 17 is a diagram illustrating a configuration of an SGDU in the IP transmission scheme.

MODE FOR CARRYING OUT THE INVENTION

Hereinafter, embodiments of the present technique will be described with reference to the drawings. Description will be made in the following order.

1. Digital broadcasting using IP transmission scheme
2. Configuration of broadcast system
3. Signaling information
 (1) Data structure of LLS (SCT and SAT)
 (2) Data structure of SCS (SDP)
4. Specific Operation Examples
 (1) Direct channel selection in shared service
 (2) Recording/reproduction corresponding to shared service
5. Examples of processing executed on each of devices
<1. Digital Broadcasting Using IP Transmission Scheme>
(Protocol Stack)

Figure 1:
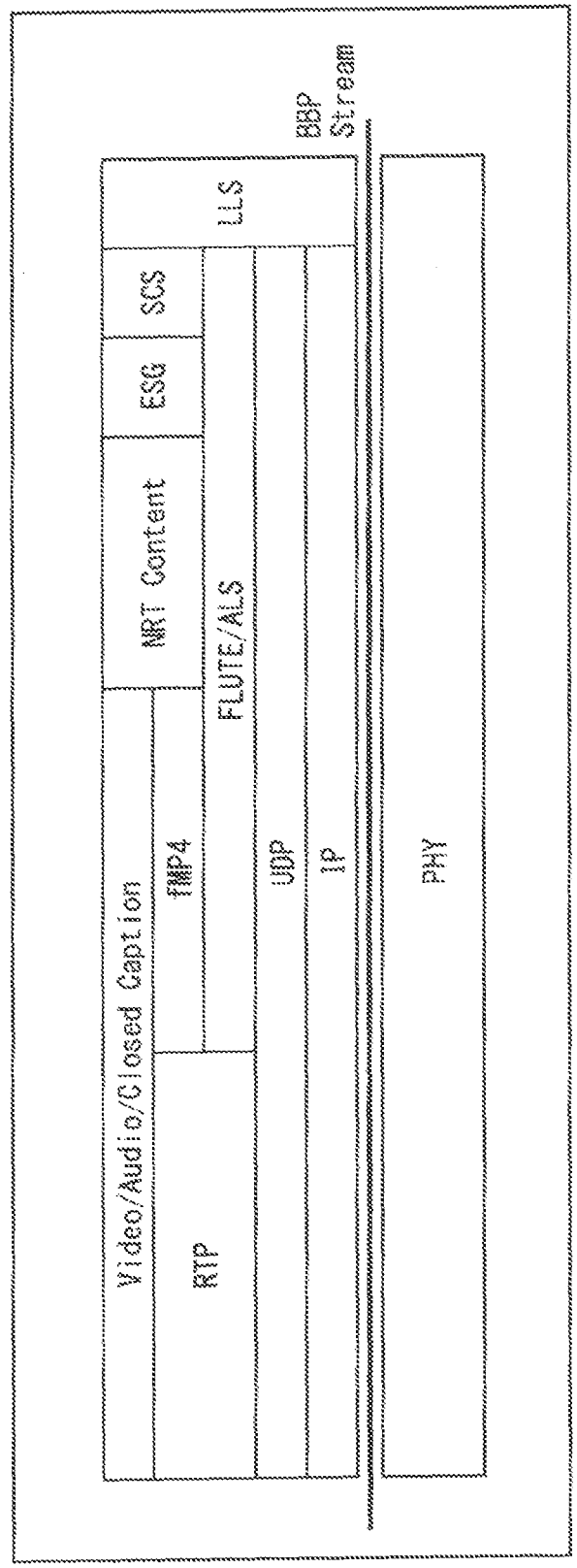
FIG. 1 is a diagram illustrating a protocol stack for digital broadcasting with the IP transmission scheme.

FIG. 1 is a diagram illustrating a protocol stack for digital broadcasting with the IP transmission scheme.

As illustrated in FIG. 1, the lowest layer is defined as a physical layer, which corresponds to a frequency band of the broadcast wave allocated to a service (channel). An upper layer adjacent to the physical layer is defined as an IP layer, with a base band packet (BBP) stream therebetween. The BBP stream is a stream that includes a packet storing various types of data in the IP transmission scheme.

The IP layer is equivalent to an internet protocol (IP) for a protocol stack of TCP/IP. In this layer, an IP packet is identified by an IP address. An upper layer adjacent to the IP layer is defined as a UDP layer. Upper layers of the UDP layer include a real-time transport protocol (RTP), file delivery over unidirectional transport (FLUTE)/ALS. In digital broadcasting with the IP transmission scheme, a packet for which a port number of user datagram protocol (UDP) has been defined is transmitted, so as to establish, for example, an RTP session and a FLUTE session. Details of the FLUTE are defined in RFC3926.

An upper layer adjacent to the FLUTE/ALS is defined as a fragmented MP4 (fMP4). An upper layer adjacent to the RTP and the fMP4 is a layer of video data (Video), audio data (Audio), and closed caption data (Closed Caption). Specifically, transmission of video data and audio data in a synchronous stream format is executed by the RTP session, and transmission of video data and audio data in an asynchronous file format is executed by the FLUTE session.

The upper layers of the FLUTE/ALS include NRT content (NRT Content), ESG, and SCS. The NRT content, the ESG and the SCS are transmitted by the FLUTE session. The NRT content is content transmitted in a non-real time (NRT) broadcasting. The NRT content is first stored in a storage of a fixed receiver and is then reproduced. Note that the NRT content is exemplary content. The configuration may be such that a file of other content is transmitted by the FLUTE session. An electronic service guide (ESG) is an electronic service guide that includes information of, for example, a program title, and a start time.

A service channel signaling (SCS) is signaling information on a per-service basis and transmitted with the FLUTE session. Examples of the SCS transmitted include a session description protocol (SDP) and an application information table (AIT)

The SDP includes a service attribute on a per-service basis, component configuration information, a component attribute, component filler information, and component location information. A relationship between a service and a component will be described below with reference to FIG. 2. The AIT is control information of an application in a hybrid service. The hybrid service refers to a service that not only uses broadcasting in a field of digital broadcasting but also works with the Internet. In such a hybrid service, an application distributed via the Internet can be executed in connection with broadcast content such as a TV program.

A low layer signaling (LLS) is lower-layer signaling information and is transmitted on the BBP stream. As the LLS, for example, service configuration information including a service configuration table (SCT) and a service association table (SAT) is transmitted.

The SCT employs a combination of a network_id, a transport_stream_id, and a service_id (hereinafter, referred to as a triplet) that is used in a MPEG2-TS format. With the triplet, the BBP stream configuration and service configuration within a broadcast network are indicated. Note that in SCT, a BBP_stream_id corresponds to the transport_stream_id. The SCT also includes information such as IP address as attribute/setting information on a per-service basis, and includes bootstrap information for accessing ESG and SCS.

The SAT indicates a service on the air for each of the BBP streams. By the SAT, it is possible to determine whether a particular service, or the like is on the air (during broadcasting).

Figure 2:
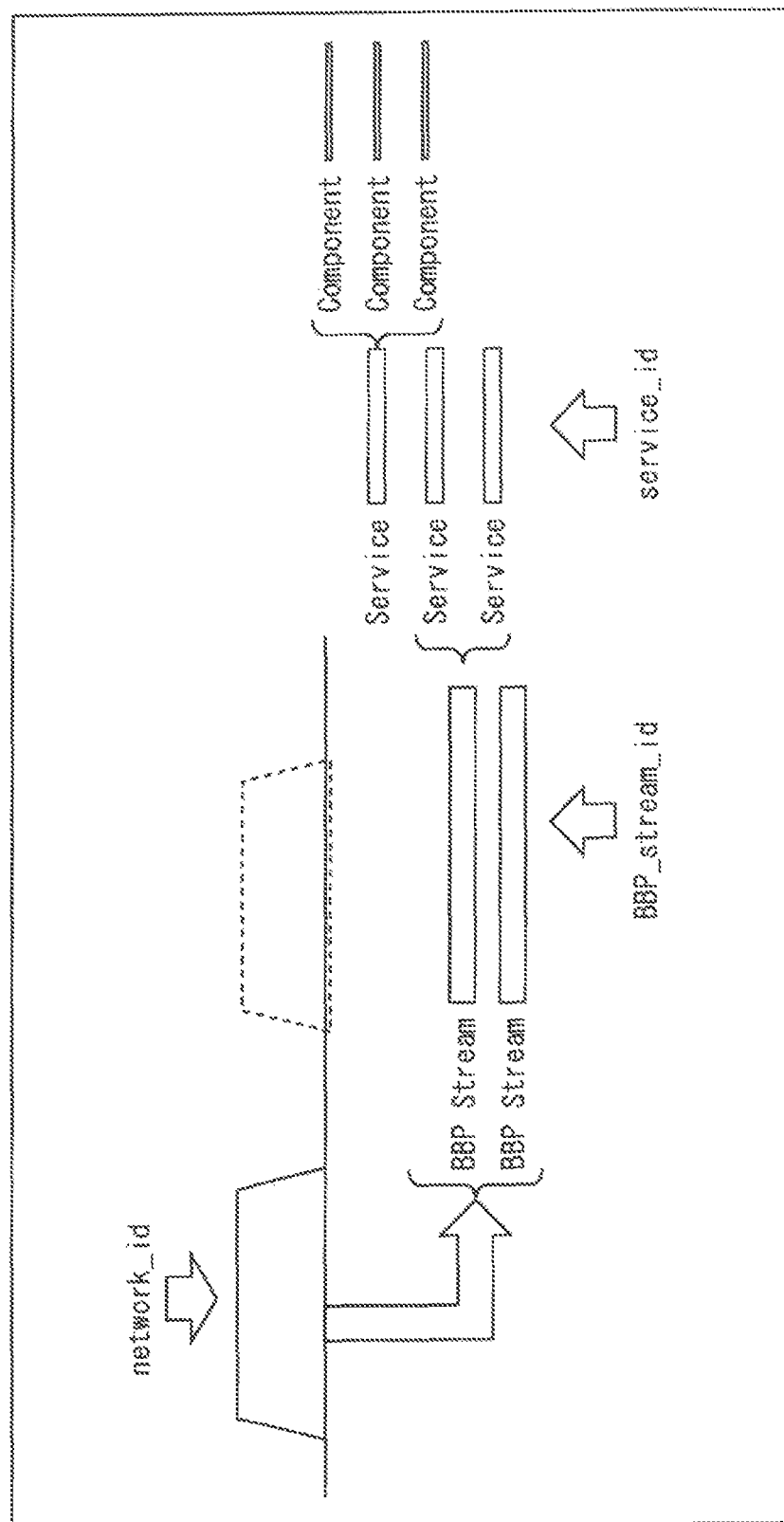
FIG. 2 is a diagram illustrating a relationship between a signal of the broadcast wave and an ID system of the IP transmission scheme.

(ID System in IP Transmission Scheme)
FIG. 2 is a diagram illustrating a relationship between a signal of the broadcast wave and an ID system of the IP transmission scheme.

As illustrated in FIG. 2, a network_id is assigned to a broadcast wave (broadcast network) having a frequency band of 6 MHz. The broadcast wave includes one or more BBP streams identified by the BBP_stream_id. The BBP stream includes a plurality of BBP packets. The BBP packet includes a BBP header and a payload.

Each of the BBP streams includes a plurality of services identified by the service_id. Each of the services includes one or more components. Examples of the components include information such as video data and audio data, which form a program.

In this manner, as similarly to the MPEG2-TS format, by adopting the triplet as an ID system of the IP transmission scheme and by using the combination of the network_id, the BBP_stream_id, and the service_id, it is possible to achieve consistency with the MPEG2-TS format. Accordingly, it is possible, for example, to easily support simulcasting at the time of shift from the MPEG2-TS format to the IP transmission scheme.

When the operation uses a major channel number and a minor channel number as identification information corresponding to the service_id, it is practical to assign upper-order 8 bits to the 8 bits of the major channel number, and assign lower-order 8 bits to the 8 bits of the minor channel number, among 16 bits in the service_id so as to support such operation.

Figure 3:
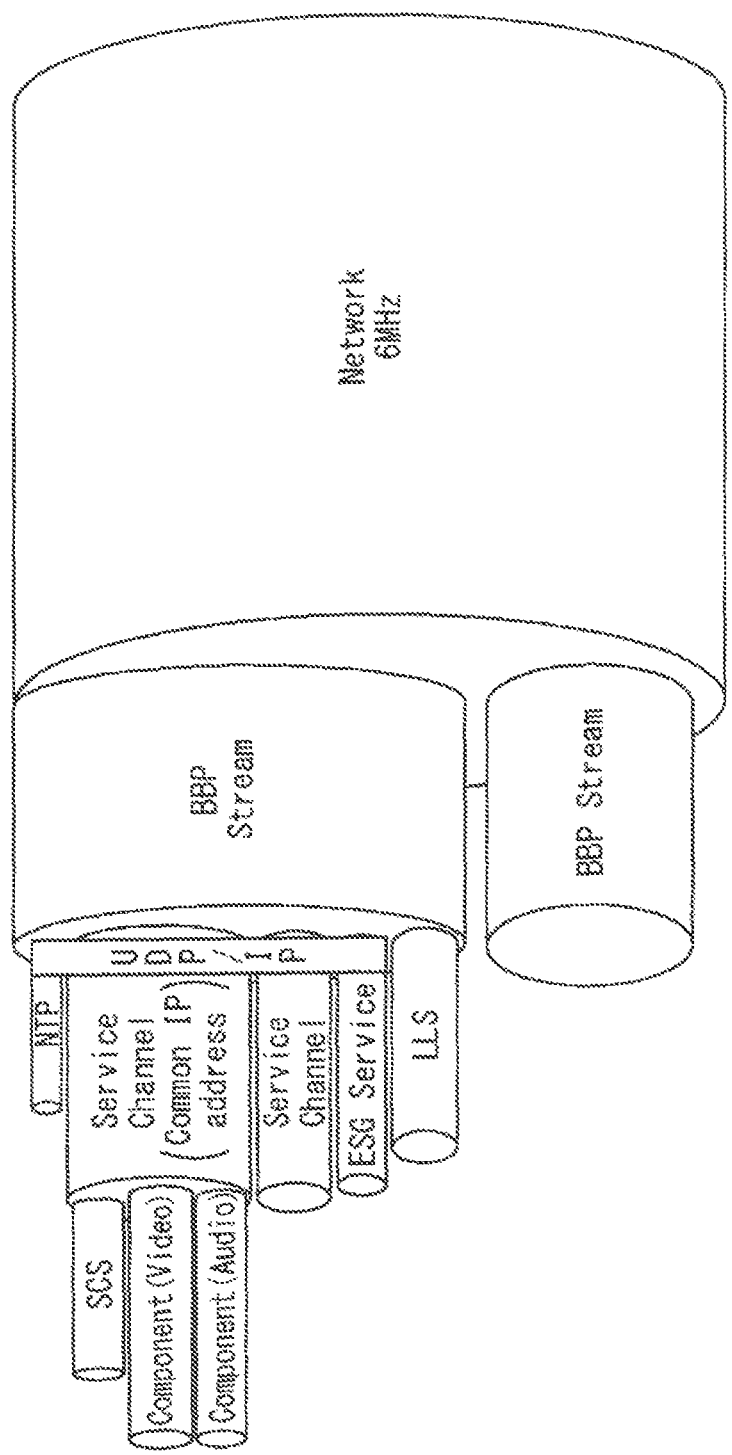
FIG. 3 is a diagram illustrating a configuration of the broadcast wave of digital broadcasting with the IP transmission scheme.

(Configuration of Broadcast Wave with IP Transmission Scheme)
FIG. 3 is a diagram illustrating a configuration of the broadcast wave of the digital broadcasting with the IP transmission scheme.

As illustrated in FIG. 3, it is possible to obtain one or more BBP streams from the broadcast wave ("Network" in FIG. 3) having a frequency band of 6 MHz. Moreover, it is possible to obtain, from each of the BBP streams, a network time protocol (NTP), a plurality of service channels, an electronic service guide (ESG Service), and the LLS. Note that the NTP, the service channel, and the electronic service guide are transmitted according to a protocol of the UDP/IP, and the LLS is transmitted on the BBP stream. Also note that the NTP is time information that is common to the plurality of service channels.

Each of the service channels includes a component such as video data and audio data, and the SCS such as the SDP and the AIT. In addition, a common IP address is assigned to each of the service channels. Using this IP address, it is possible to package a component, a control signal, or the like, for each of one or more service channels.

Note that in FIG. 3, the "BBP stream" and "component" correspond to the same terms in FIG. 2, but the term "service channel" corresponds to the "service" to FIG. 2. Similarly, hereinafter, a "service channel" is used to represent a "service" in some cases.

Figure 4:
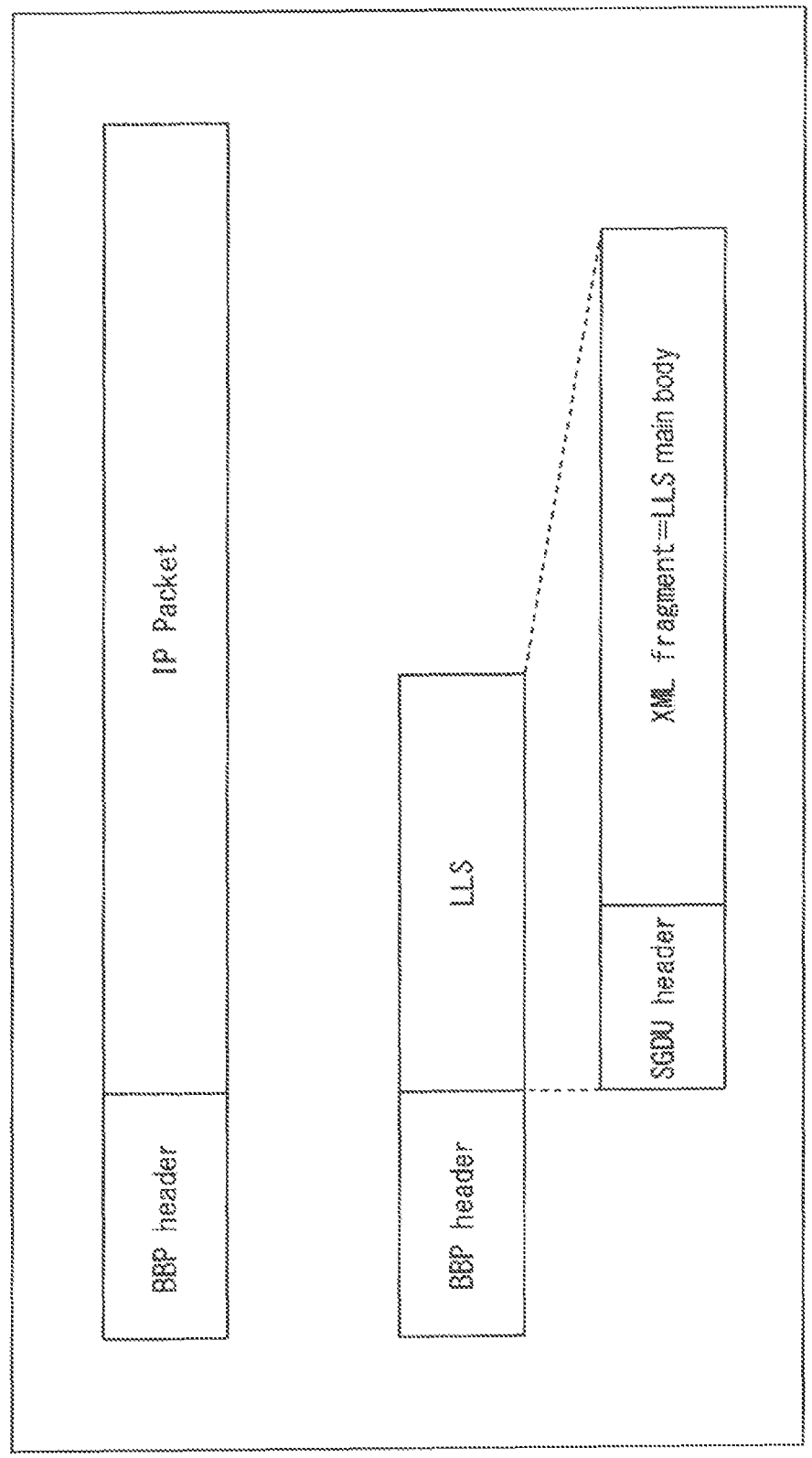
FIG. 4 is a diagram illustrating a configuration of an LLS in the IP transmission scheme.

(Configuration of LLS)
FIG. 4 is a diagram illustrating a configuration of the LLS in the IP transmission scheme.

As illustrated in FIG. 4, the BBP packet includes a BBP header and a payload. When the IP packet is transmitted by the BBP stream, a portion of payload is the IP packet.

When the LLS is transmitted on the BBP stream, the LLS is arranged next to the BBP header. As the LLS, for example, the SCT and the SAT described in an extensible markup language (XML) format are arranged. In this, an XML fragment, which is a part of the data, forms an LLS main body, with a SGDU header attached to it. With this, the SCT and the SAT are transmitted by a service guide delivery unit (SGDU) container. Note that the SGDU has been adopted as a standard of an open mobile alliance (OMA).

The BBP header includes two-bit type information. With the type information, it is possible to determine whether the BBP packet is the IP packet or the LLS.

Figure 5:
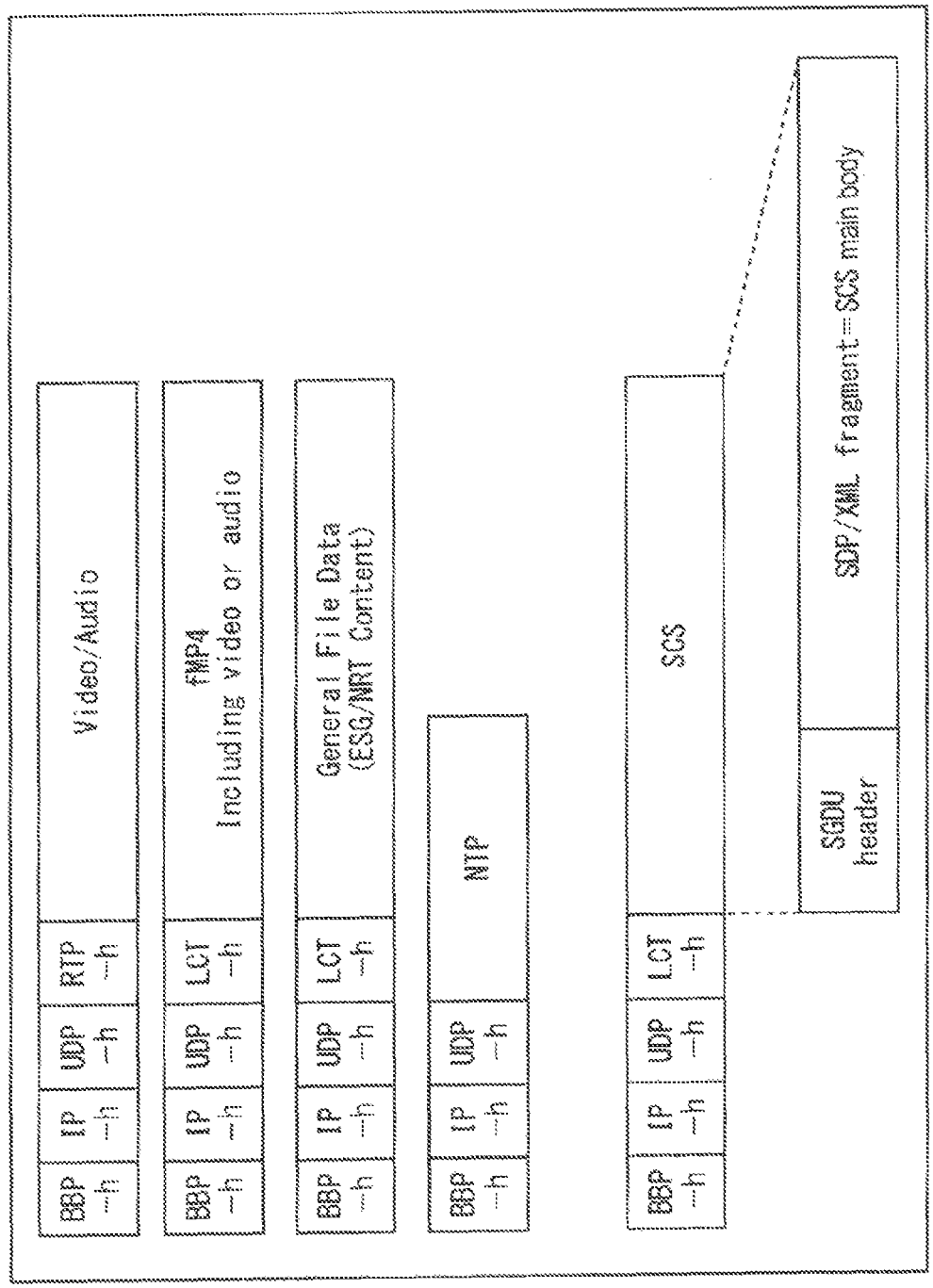
FIG. 5 is a diagram illustrating a configuration of an SCS in the IP transmission scheme.

(Configuration of SCS)
FIG. 5 is a diagram illustrating a configuration of the SCS in the IP transmission scheme.

As illustrated in FIG. 5, when video data or audio data are transmitted in a synchronous stream format, the RTP session is utilized. Accordingly, each of headers of BBP, IP, UDP, and RTP is added to the payload. When file data such as fMP4, ESG and NRT content are transmitted in an asynchronous file format, the FLUTE session is utilized. Accordingly, each of the headers of BBP, IP, UDP, and LCT is added to the payload. Moreover, the NTP is an upper layer of the UDP layer, and thus is arranged next to each of the headers of the BBP, IP, and UDP.

The SCS is transmitted by using the FLUTE session and thus is arranged next to each of the headers of BBP, IP, UDP, and LCT. As the SCS, for example, an SDP described in a text format is arranged. In this, the SGDU header is added with an SDP fragment, which is part of data, being the SCS main body. With this configuration, the SDP is transmitted in the SGDU container. Note that it is not only the SDP fragment that is arranged as the SCS main body. It is possible, for example, to arrange an XML fragment of the AIT described in the XML format, and to allow it to be transmitted in the SGDU container.

(Concept of Service Channel)

Figure 6:
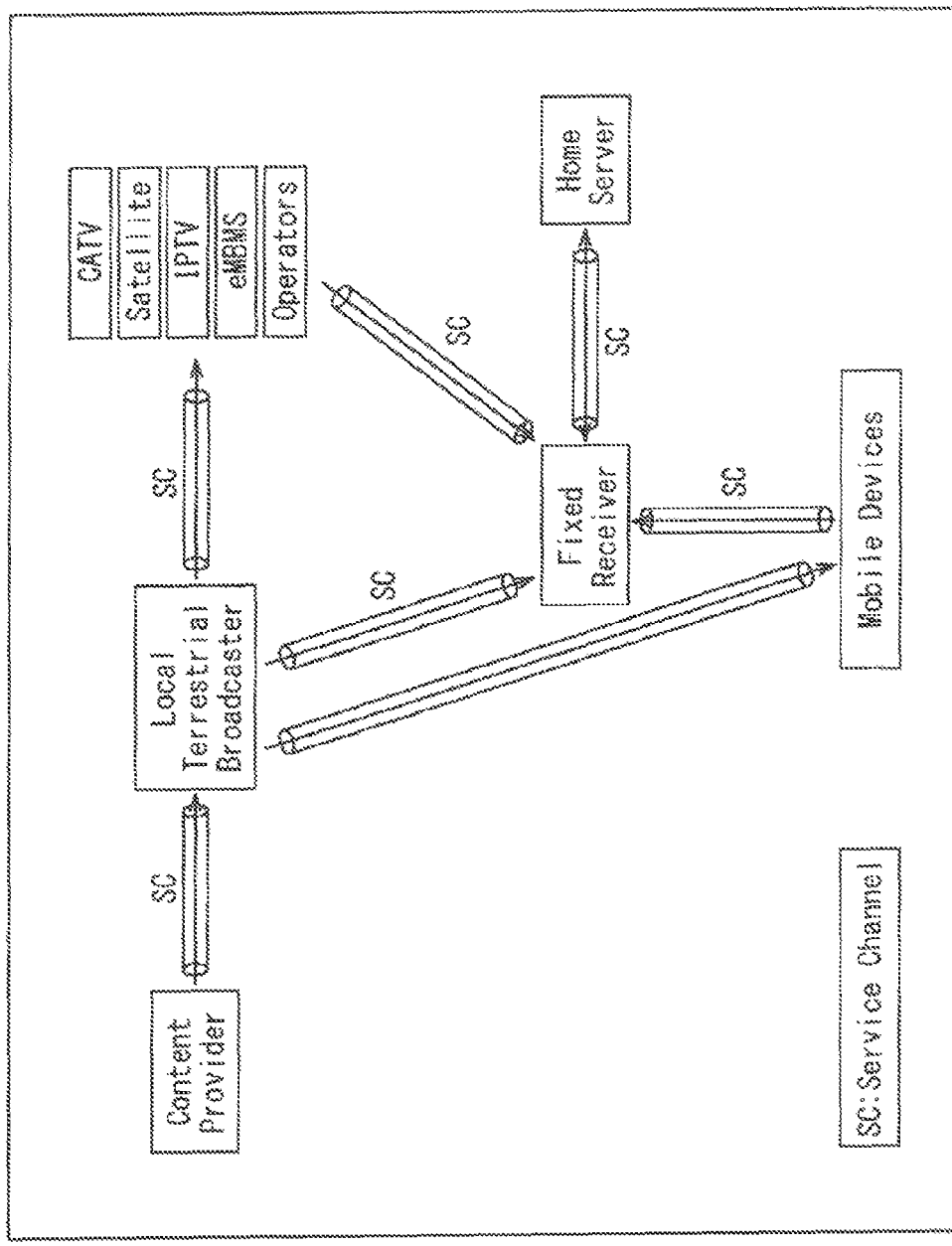
FIG. 6 is a diagram illustrates a concept of a service channel.

FIG. 6 is a diagram illustrates a concept of a service channel (SC).

As illustrated in FIG. 6, when content created by a content provider is provided to a local terrestrial broadcaster, the IP transmission scheme in the present technique is configured to provide the content on a per-service basis by packaging components and control signals that are to have the same IP address. When a service that is related to a particular service and is shared with another service (hereinafter, referred to as a "shared service") is utilized, the particular service and the shared service would have different IP addresses. Accordingly, packaging would be executed using a plurality of IP addresses. In this case, an IP address for the particular service and another IP address for the shared service are used for packaging the constituents of those services. One or more constituents of the service that have been packaged as described above form the service channel.

The local terrestrial broadcaster is operated such that service channels are provided for CATV carriers, satellite broadcasters (Satellite), IPTV camera, evolved multimedia broadcast multicast services (eMBMS) camera, and operators. The CATV carriers can, for example, add constituents such as a shared service and an application to a particular service channel and perform re-packaging.

A fixed receiver receives a service channel provided from the local terrestrial broadcaster and CATV, or the like. The fixed receiver displays an image obtained from the service channel and outputs a sound that corresponds to the image from a speaker. The fixed receiver is also capable of transmit a service channel to a home server and a mobile device connected to a home network formed inside a home. With this configuration, data of service channels transmitted from the fixed receiver are accumulated. On the mobile devices, an image obtained from the service channel transmitted from the fixed receiver is displayed on a display, and the sound that corresponds to the image is output from the speaker. The configuration may be such that the mobile device directly receives the service channel transmitted from the local terrestrial broadcaster.

In this is manner, it is possible to package not only signals of constituents of a particular service with a same IP address, such video data, audio data, control signals, but also signals of constituents of the shared service with a different IP address. With this configuration, even when a shared service that is shared with another service is utilized, it is possible to handle data on a per-service basis, and thus to flexibly support various operation modes.

(Concept of Stored Service)

Figure 7:
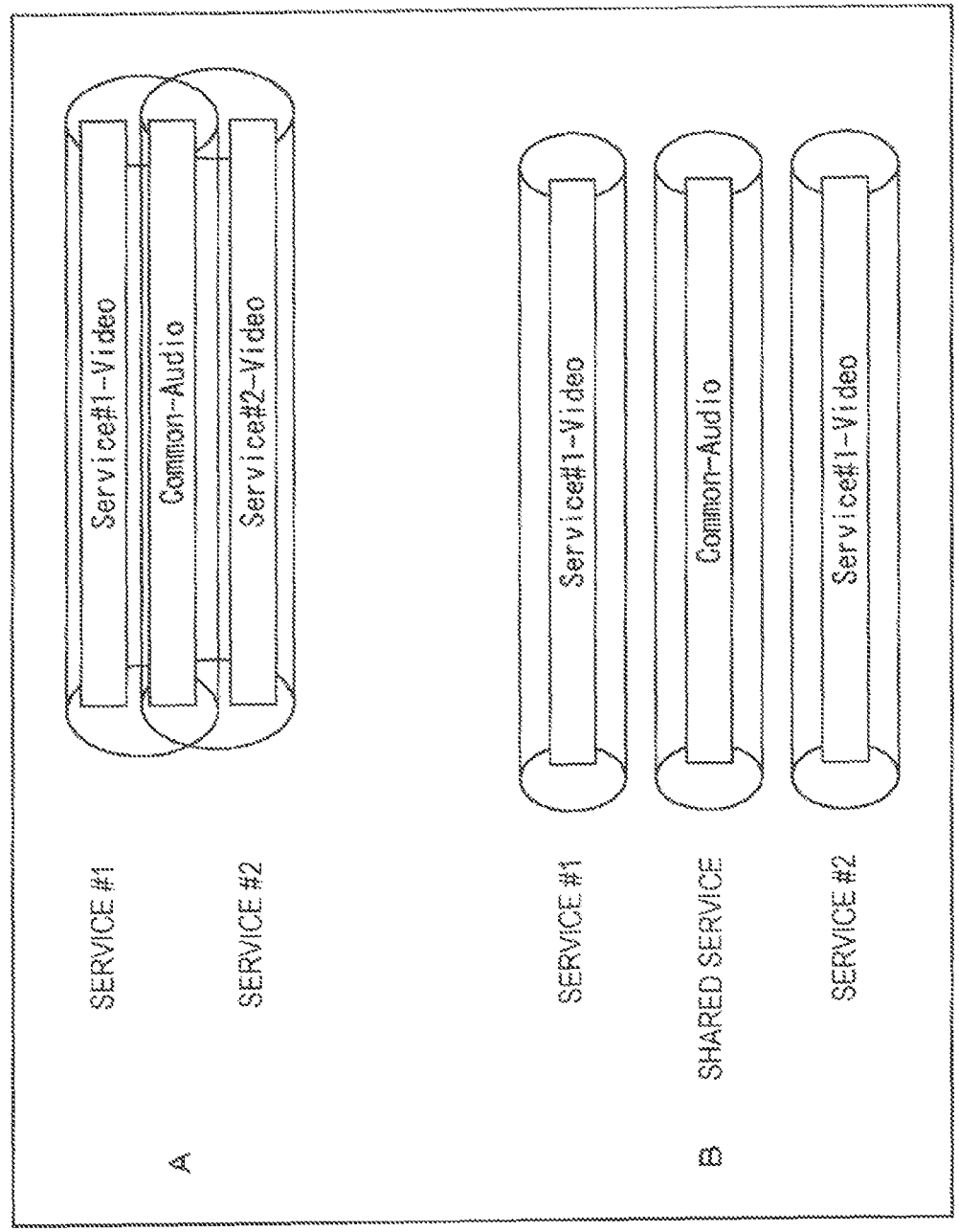
FIGS. 7A and 7B are diagrams illustrating a concept of a shared service.

FIGS. 7A and 7B are diagrams illustrating a concept of a shared service.

As illustrated in FIG. 7A, each of a service 1 (Service#1-Video) and a service 2 (Service#2-Video) has specific video data, but has audio data (Common-Audio) that are common to both services. In this case, the common audio data are included in the service 1 and the service 2, integrated with the services. Accordingly, it is not possible to define an IP address on a per-service basis to the common audio data. That is, it is merely possible to define the IP address on a per component basis.

To cope with this, the IP transmission scheme according to the present technique provides a configuration in which, as illustrated in FIG. 7B, the common audio data (Common-Audio) is not included integrally in the service 1 (Service#1-Video) and the service 2 (Service#2-Video) but formed as another service as a shared service. In other words, the shared service (Common-Audio) is determined as another adjunct service to the service 1 (Service#1-Video) and the service 2 (Service#2-Video). Accordingly, it is possible to define an IP address on a per-service basis.

In this case, the service 1 does not include common audio data (Common-Audio), but includes solely specific video data (Service#1-Video) as a component. Similarly, the service 2 does not include common audio data (Common-Audio), but includes solely specific video data (Service#2-Video) as a component.

In this manner, by configuring the related shared component as a separate service from a particular service and determining it as a shared service, it is possible to assign an IP address on a per-service basis. Accordingly, it is also possible to handle the shared service (shared component) on a per-service basis.

In FIGS. 7A and 7B, an example of audio data is described as a shared component to be transmitted as a shared service. The configuration may, however, include another component other than the audio data, such as video data and closed caption data, as long as they are components that can be shared with a plurality of services. Moreover, the configuration may be such that a plurality of shared components are transmitted as components to be transmitted as the shared service.

(Specific Examples of Shared Service)

Figure 8:
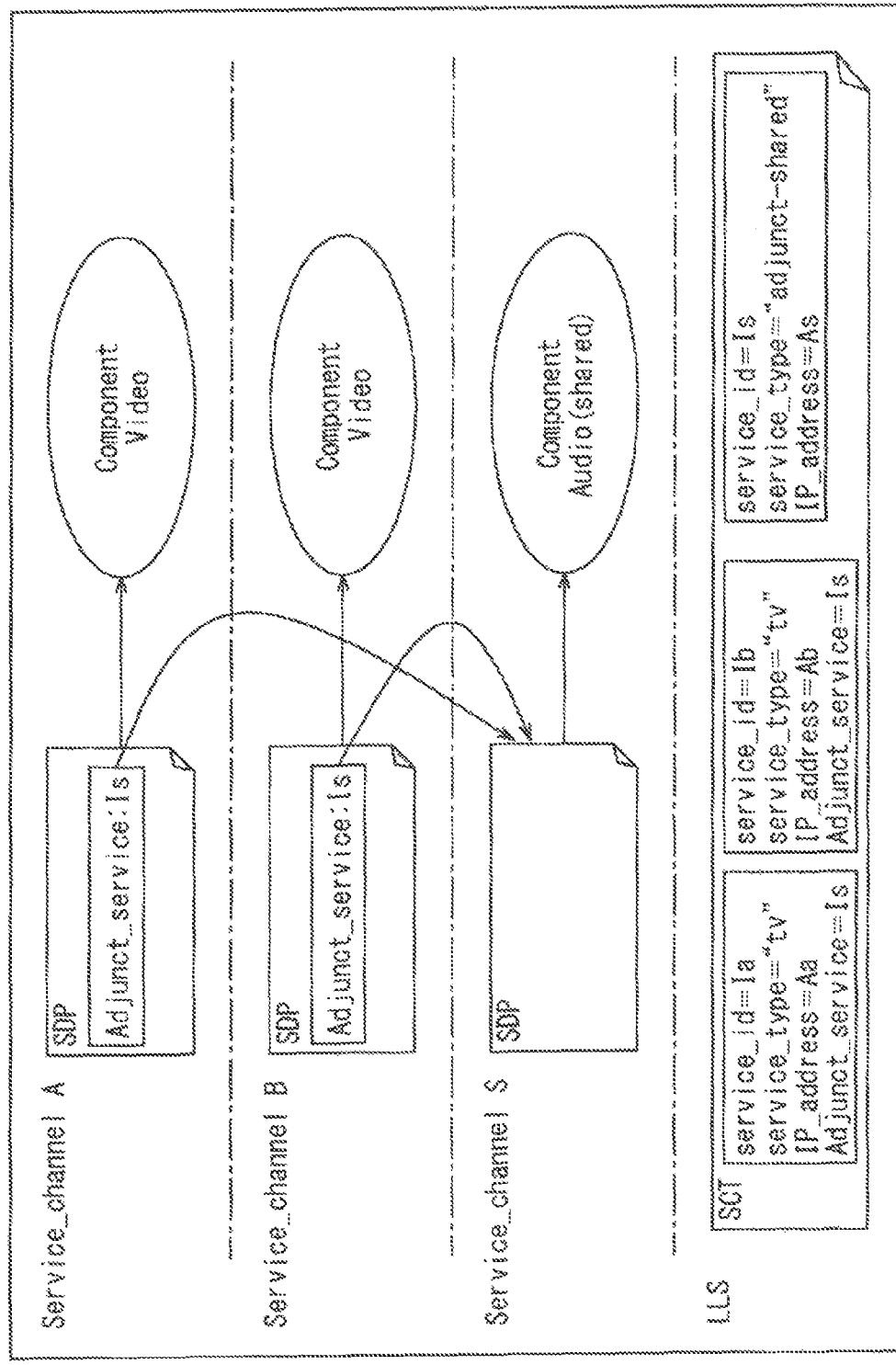
FIG. 8 is a diagram illustrating a specific example of the shared service.

FIG. 8 is a diagram illustrating a specific example of the shared service.

FIG. 8 illustrates a case where each of the service A (Service_channel A) and the service B (Service_channel B) provide video data specific to each of the services and where the shared service S (Service_channel S) provides audio data shared with the service A and the service B.

As illustrated in FIG. 8, the SCT is transmitted with as the LLS. The SCT is transmitted in a transmission cycle of one second, for example, and is obtained in an initial scan or from a dedicated server (not illustrated) on an Internet 90.

The SCT indicates, by a triplet, a BBP stream configuration and a service configuration inside a broadcast network. In the SCT, a BBP stream loop, which is identified by the BBP_stream_id (not illustrated), is arranged, other than the network_id. Inside the BBP stream loop, a service loop identified by the service_id is arranged, other than ESG_bootstrap information. Inside the service loop, an IP address of each of the services, SCS_bootstrap information, and AdjunctService information are further arranged. The SCT also includes information regarding the physical layer and thus is used as channel selection information.

The example in FIG. 8 illustrates part of information described in the SCT. In the SCT, various information is described for each of the services. For example, in the service A, service_id="Ia", service_type="tv", IP_address="Aa", and Adjunct_service="Is" are defined. In the service B, service_id="Ib", service_type="tv", IP_address="Ab", and Adjunct_service="Is" are defined. In the shared service S, service_id="Is", service_type="adjunct_shared", and IP_address="As" are defined.

The information indicates that each of the service A and the service B has a service type of television (TV) and has shared audio data of the shared service S defined by service_id="1s". The information indicates that the shared service S has a service type of shared (adjunct-shared) and the service is an adjunct to another service.

As illustrated in FIG. 8, the SDP is transmitted as the SCS. The SDP is transmitted in a transmission cycle of 100 milliseconds, for example. The SDP at least includes component-related information and is prepared for each of the services. In a case where the shared service is utilized, AdjunctService information is arranged in the SDP. For example, Adjunct_service="1s" is defined in the SDP of the service A. By using this, it is possible to access the SDP of the shared service S. In addition, for example, Adjunct_service="1s" is defined in the SDP of the service B. By using this, it is possible to access the SDP of the shared service S.

In the SDP of each of the services, information needed to obtain a component (e.g. port number) is described. Accordingly, by accessing the component according to the obtained information, it is possible to obtain a target component. For example, when the service A is selected, video data of the service A and audio data of the shared service S are obtained. In addition, when the service B is selected, for example, video data of the service B and audio data of the shared service S are obtained.

As a method for identifying the shared service S shared by the service A and the service B, it is possible to use both the SCT and the SDP, or use the SCT solely to identify the shared service S so as to obtain a shared component.

(Another Example of AdjunctService Information)

Figure 9:
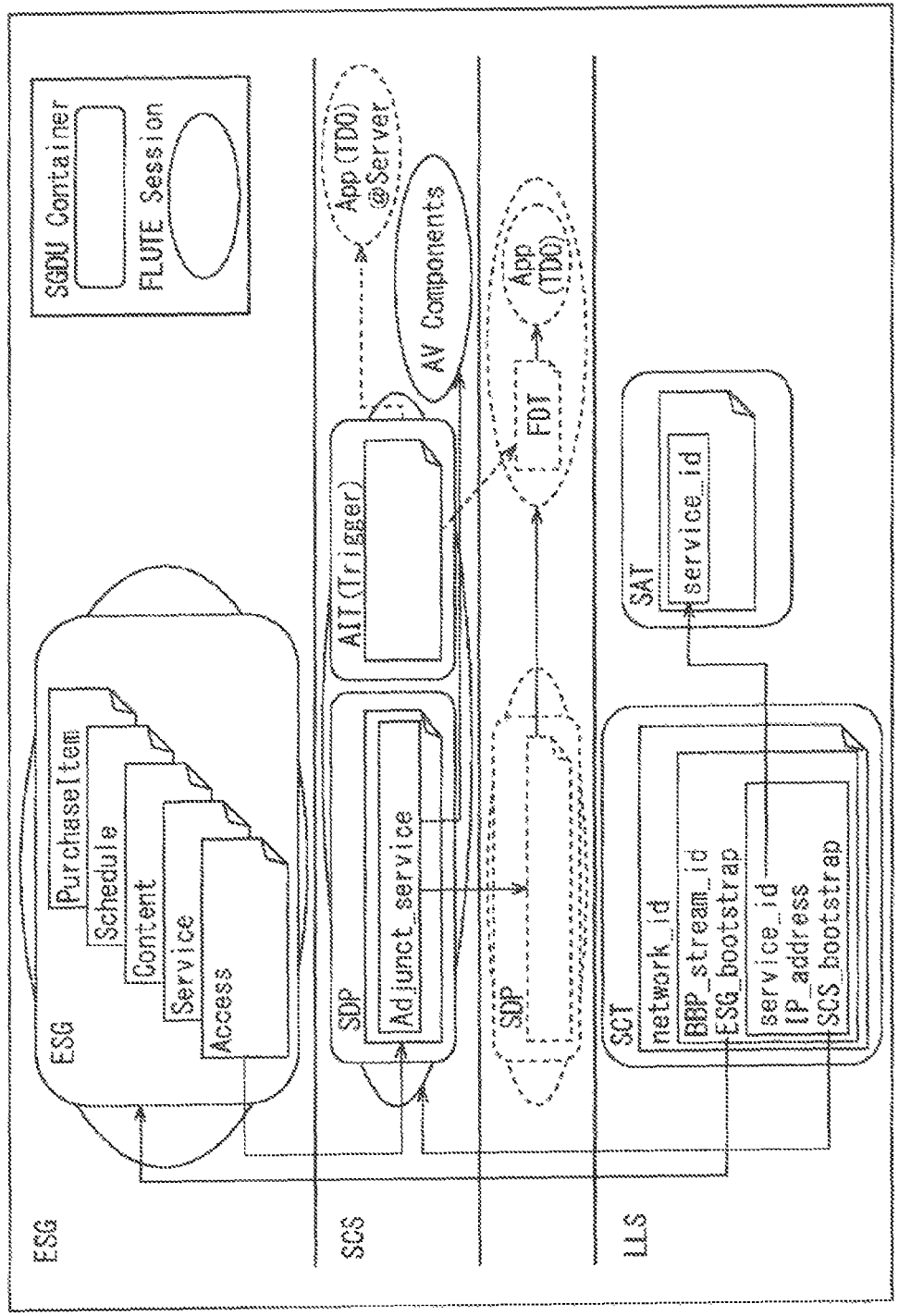
FIG. 9 is a diagram illustrating another example of AdjunctService information.

FIG. 9 is a diagram illustrating another example of AdjunctService information.

In the hybrid service, as illustrated in FIG. 9, the SCT and the SAT are transmitted as the LLS. In the hybrid service, an SCS and an ESG are transmitted in the FLUTE session. The ESG is an electronic service guide including Access, Service, Content, Schedule, and PurchaseItem. In the SDP, AdjunctService information is defined. With this AdjunctService information, the SDP is associated with the SDP transmitted in another FLUTE session.

In the hybrid service, the AIT other than the SDP is used as the SCS. Based on the AIT, an application transmitted in the FLUTE session, or an application provided by an application server (an application server 50 in FIG. 10, to be described below) is obtained and executed in connection with a TV program, or the like.

<2. Configuration of Broadcast System>

(Exemplary Configuration of Broadcast system)

Figure 10:
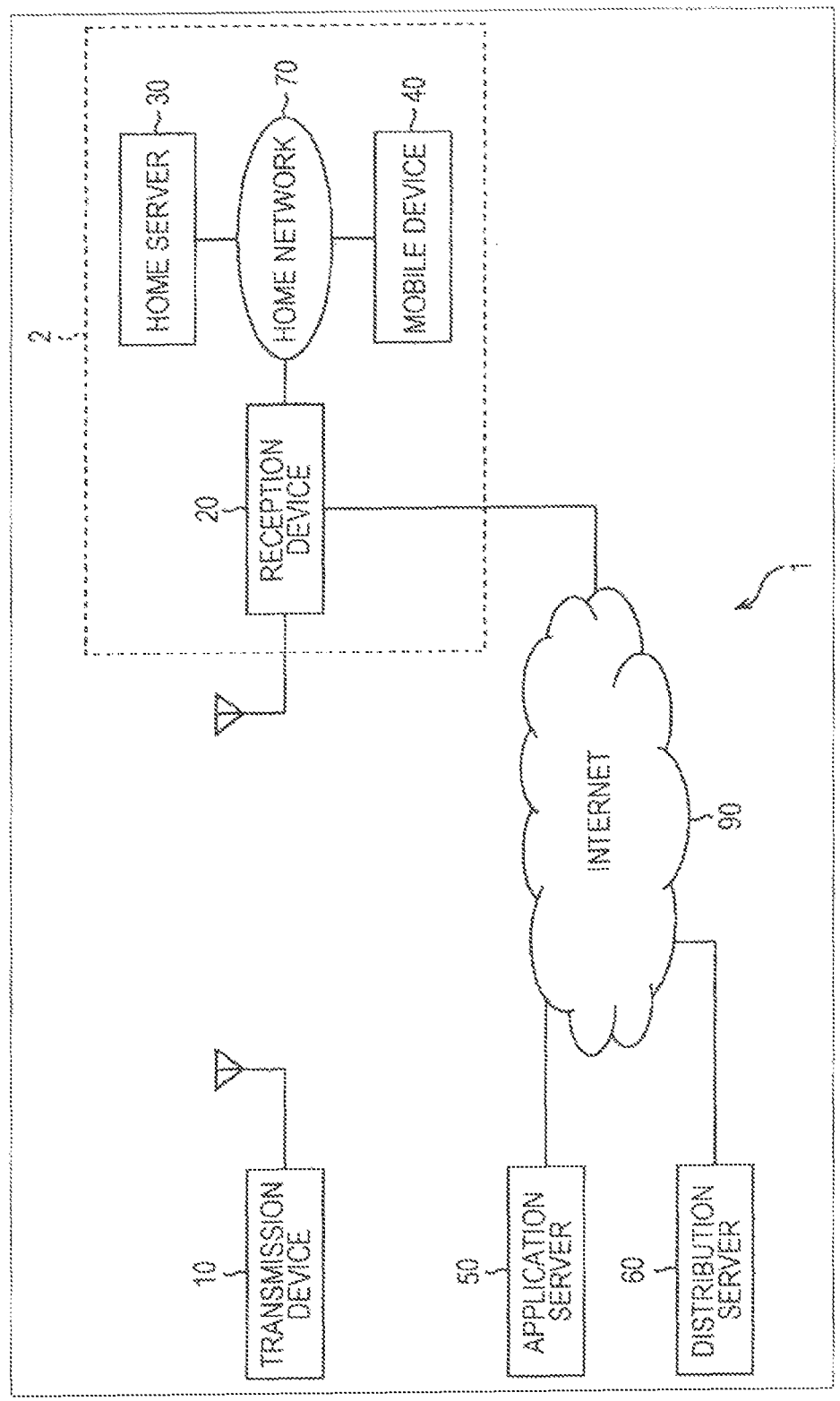
FIG. 10 is a diagram illustrating a configuration according to an embodiment of a broadcast system to which the present technique is applied.

FIG. 10 is a diagram illustrating a configuration according to an embodiment of a broadcast system to which the present technique is applied.

As illustrated in FIG. 10, a broadcast system 1 includes a transmission device 10, a reception device 20, a home server 30, a mobile device 40, an application server 50, and a distribution server 60. The reception device 20, the home server 30, and the mobile device 40 are installed inside a house 2, and interconnected with each other via a home network 70. The reception device 20, the application server 50, and the distribution server 60 are interconnected with each other via the Internet 90.

The transmission device 10 transmits broadcast content such as a TV program via the broadcast wave of digital broadcasting using the IP transmission scheme.

The reception device 20 receives a broadcast signal transmitted from the transmission device 10 to obtain the image and the sound of the broadcast content. The reception device 20 displays the image of the broadcast content on a display, and simultaneously outputs the sound synchronized with the image. The reception device 20 may be provided as a standalone device that includes a display and a speaker, or may be incorporated into the television receiver and a video recorder.

The reception device 20 exchanges various data with the home server 30 via the home network 70. The home server 30 receives data from the reception device 20 and stores it, and also provides data in response to a request from the reception device 20, via the home network 70.

The reception device 20 exchanges various data with the mobile device 40 via the home network 70. The mobile device 40 receives data transmitted from the reception device 20 via the home network 70. The mobile device 40 may be a mobile device such as a smartphone and a tablet terminal.

The application server 50 controls applications executed in connection with the broadcast content. The application server 50, in response to a request from the reception device 20, provides an application via the Internet 90. The reception device 20 allows the application obtained from the application server 50 to be executed in connection with the broadcast content.

The distribution server 60 provides communication content such as a broadcasted program and a released movie using a video on demand (VOD) via the Internet 90. The reception device 20 receives the communication content distributed from the distribution server 60 via the Internet 90. The reception device 20 displays the image of the communication content on a display, and simultaneously outputs the sound synchronized with the image.

The configuration of the broadcast system 1 is as described above.

(Exemplary Configuration of Transmission Device)

Figure 11:
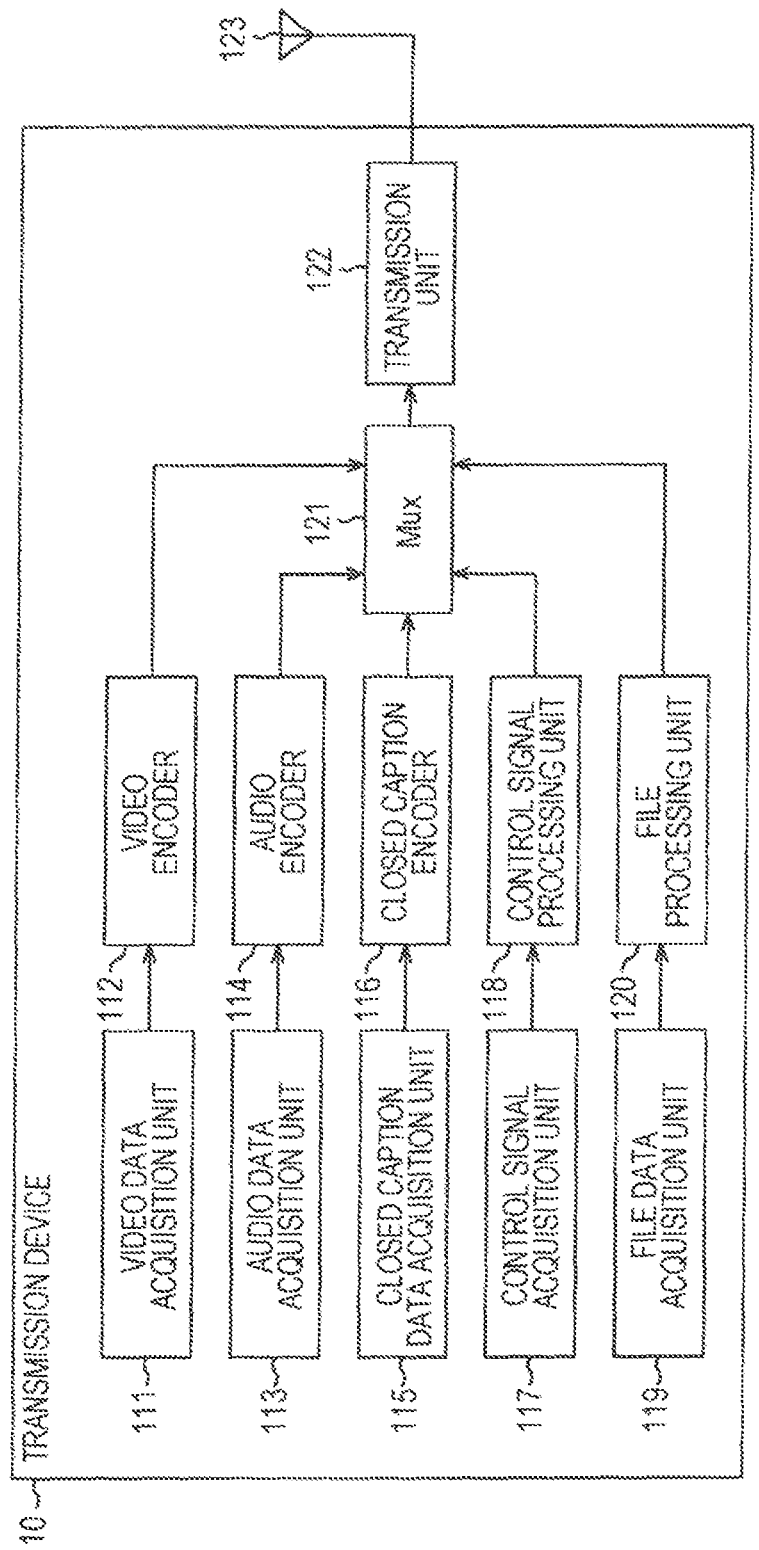
FIG. 11 is a diagram illustrating a configuration according to an embodiment of a transmission device to which the present technique is applied.

FIG. 11 is a diagram illustrating a configuration according to an embodiment of a transmission device to which the present technique is applied.

As illustrated in FIG. 11, the transmission device 10 includes a video data acquisition unit 111, a video encoder 112, an audio data acquisition unit 113, an audio encoder 114, a closed caption data acquisition unit 115, a closed caption encoder 116, a control signal acquisition unit 117, a control signal processing unit 118, a file data acquisition unit 119, a file processing unit 120, an Mux 121, and a transmission unit 122.

The video data acquisition unit 111 obtains video data from a built-in storage, an external server, a camera, or the like, and supplies the video data to the video encoder 112. The video encoder 112, based on an encoding method such as MPEG, encodes the video data supplied from the video data acquisition unit 111 and supplies the encoded data to the Mux 121.

The audio data acquisition unit 113 obtains audio data from a built-in storage, an external server, microphone, or the like, and supplies the data to the audio encoder 114. The audio encoder 114, based on an encoding method such as MPEG encodes the audio data supplied from the audio data acquisition unit 113 and supplies the encoded data to the Mux 121.

The closed caption data acquisition unit 115 obtains closed caption data from a built-in storage, an external server, or the like, and supplies the data to the closed caption encoder 116. The closed caption encoder 116, based on a predetermined encoding method, encodes the closed caption data supplied from the closed caption data acquisition unit 115, and supplies the encoded data to the Mux 121.

The control signal acquisition unit 117 obtains control signals such as the LLS and the SCS from a built-in storage and an external server and supplies the signal to the control signal processing unit 118. The control signal processing unit 118 executes predetermined signal processing on the control signal supplied from the control signal acquisition unit 117 and supplies the processed signal to the Mux 121. For example, the control signal processing unit 118 executes signal processing needed for transmission in the FLUTE session, on the SCS obtained by the control signal acquisition unit 117.

The file data acquisition unit 119, when it transmits data with an asynchronous file format, obtains file data such as NRT content and an application from a built-in storage and an external server, and supplies the file data to the file processing unit 120. The file processing unit 120 executes predetermined file processing on the file data supplied from the file data acquisition unit 119, and supplies the processed data to the Mux 121. For example, the file processing unit 120 executes file processing needed for transmission in FLUTE session, on the file data obtained by the file data acquisition unit 119.

The Mux 121 multiplexes video data from the video encoder 112, audio data from the audio encoder 114, closed caption data from the closed caption encoder 116, a control signal from the control signal processing unit 118, and file data from the file processing unit 120, so as to create a BBP stream with the IP transmission format and supplies the created BBP stream to the transmission unit 122. The transmission unit 122 transmits the BBP stream supplied from Mux 121, as a broadcast signal via an antenna 123.

(Exemplary Configuration of Reception Device)

FIG. 12 is a diagram illustrating a configuration according to an embodiment of a reception device to which the present technique is applied.

As illustrated in FIG. 12, the reception device 20 includes a tuner 212, a Demux 213, a clock generator 214, a video decoder 215, a video output unit 216, an audio decoder 217, an audio output unit 218, a closed caption decoder 219, a FLUTE processing unit 220, a storage 221, a control signal processing unit 222, an NVRAM 223, a service package unit 224, a communication I/F 225, a browser 226, and a screaming processing unit 227.

The tuner 212 extracts, from the broadcast signal received by an antenna 211, the broadcast signal of the service selected by indication, and decodes the signal. The tuner 212 supplies the BBP stream in IP transmission format obtained as the result to the Demux 213.

The Demux 213 demultiplexes the BBP stream in IP transmission format supplied from the tuner 212 into video data, audio data, closed caption data, a control signal, or the like, and outputs them to a block of a succeeding stage. Specifically, the Demux 213 includes a BBP filter 251, an IP filter 252, a UDP filter 253, an LCT filter 254, and an SGDU filter bank 255. The BBP filter 251, bused on the BBP header, executes filtering processing and supplies the LLS to the SGDU filter bank 255.

The IP filter 232 executes filtering processing based on an IP header. The UDP filter 253 executes filtering processing based on a UDP header. The LCT filter 254 executes filtering processing based on an LCT header. With the filtering processing executed by the IP filter 252 and the LCT filter 254, the NTP is supplied to a clock generator 214, and the SCS is supplied to the SGDU filter bank 255. Furthermore, each of video data, audio data, closed caption data is supplied to the video decoder 215, the audio decoder 217, and the closed caption decoder 219, respectively. In addition, various types of file data are supplied to the FLUTE processing unit 220.

The SGDU filter bank 255 executes filtering processing based on the SGDU header and supplies the LLS and the SCS appropriately to the control signal processing unit 222 or to the FLUTE processing unit 220. The IP filter 252 executes filtering processing based on one or more IP addresses, and supplies information such as a component (Audio/Video), a control signal (SCS), time information (NTP), the electronic service guide (ESG) to the service package unit 224.

The clock generator 214 based on the NTP supplied from the Demux 213, creates a clock signal and supplies the signal to the video decoder 215, the audio decoder 217, and the closed caption decoder 219.

The video decoder 215, based on a clock signal supplied from the clock generator 214, decodes the video data supplied from the Demux 213 with a decoding method that corresponds to the video encoder 112 (FIG. 11) and supplies the decoded video data to the video output unit 216. The video output unit 216 outputs the video data supplied from the video decoder 215 onto a display (not illustrated) of a succeeding stage. With this configuration, the display displays, for example, an image of a TV program.

The audio decoder 217, based on a clock signal supplied from the clock generator 214, decodes the audio data supplied from the Demux 213 with a decoding method that corresponds to the audio encoder 114 (FIG. 11) and supplies the decoded audio data to the audio output unit 218. The audio output unit 218 outputs the audio data supplied from the audio decoder 217 onto a speaker (not illustrated) of a succeeding stage. With this configuration, the speaker outputs, for example, a sound that corresponds to an image of a TV program.

The closed caption decoder 219, based on a clock signal supplied from the clock generator 214, decodes the closed caption data supplied from the Demux 213 with a decoding method that corresponds to the closed caption encoder 116 (FIG. 11) and supplies the decoded closed caption data to the video output unit 216. In a case where the closed caption data is supplied from the closed caption decoder 219, the video output unit 216 combines the closed caption data with the video data from the video decoder 215, and supplies the combined data to a display (not illustrated) of a succeeding stage. With this configuration, the display displays an image of a TV program, together with a closed caption that corresponds to the image.

The FLUTE processing unit 220, based on various file data supplied from the Demux 213, reconstructs an ESG, an application, NRT content, or the like. For example, the FLUTE processing unit 220 stores the reconstructed ESG, or the NRT content in the storage 221. As another example, the FLUTE processing unit 220 supplies the reconstructed application to the browser 226. In addition, the FLUTE processing unit 220 supplies an SCS supplied from the Demux 213 to the control signal processing unit 222. Note that it is possible to configure such that the SCS is supplied directly from the Demux 213 to the control signal processing unit 222, without passing through the FLUTE processing unit 220.

The storage 221 is a large-capacity storage unit such as a hard disk drive (HDD). The storage 221 stores various types of data supplied from the FLUTE processing unit 220, or the like.

The control signal processing unit 222 controls operation of each of units based on control signals (the LLS and the SCS) supplied from the Demux 213 or the FLUTE processing unit 220. The NVRAM 223 is a non-volatile memory and stores various types of data according to control from the control signal processing unit 222.

The service package unit 224 packages a component, control signals, time information and service-channel constituents such as the electronic service guide, supplied from the Demux 213, and stores them in the storage 221. The service package unit 224 also reads packaged service-channel data from the storage 221, depackages them, and supplies the depackaged data to the IP Filter 252 of the Demux 213. With this configuration, it is possible to reconstruct packaged service-channel constituents and reproduce them. The packaged service-channel data can be provided to the home server 30, the mobile device 40, or the like, connected to the home network 70, via the communication I/F 225.

The communication I/F 225 exchanges data with the home server 30, the mobile device 40, or the like, connected to the home network 70. In addition, the communication I/F 225 receives an application from the application server 50 provided on the Internet 90 and supplies the application to the browser 226. The application is supplied to the browser 226 from the FLUTE processing unit 220 or from the communication I/F 225. The browser 226 creates, for example, video data according to the application formed with an HTML document described in a hyper text markup language 5 (HTML5) and supplies the video data to the video output unit 216. With this configuration, the display displays an image of an application in connection with the TV program.

In addition, the communication I/F 225 receives communication content data distributed from the distribution server 60 provided on the Internet 90 and supplies the data to the streaming processing unit 227. The streaming processing unit 227 executes various types of processing needed for performing streaming reproduction, on the data supplied from the communication I/F 225, and then, obtains video data and audio data. The streaming processing unit 227 supplies the obtained video data to the video output unit 216 and supplies the obtained audio data to the audio output unit 218. With this configuration, an image of the communication content is displayed on the display, and the sound synchronized with the image is output from the speaker.

On the reception device 20 in FIG. 12, for example, the tuner 212, the Demux 213, the clock generator 214, the video decoder 215, the video output unit 216, the audio decoder 217, the audio output unit 218, the closed caption decoder 219, the storage 221, the NVRAM 223, and the communication I/F 225 are configured as hardware. In contrast, on the reception device 20, for example, the FLUTE processing unit 220, the control signal processing unit 222, the service package unit 224, the browser 226, and the streaming processing unit 227 are implemented by a program executed by a CPU (a CPU 901 in FIG. 28).

In the description of the configuration of the reception device 20 in FIG. 12, the storage 221 is a built-in type. Alternatively, the storage may be an external type.

(Details of Filtering Processing)

Next, filtering processing of each of packets performed by the Demux 213 (FIG. 12) will be described in detail, with reference to FIG. 13.

As illustrated in FIG. 13, various types of header information, the LLS, the NTP, and the SCS as payloads, or each of the packets containing various types of file data, video data, or audio data, are input into the Demux 213.

The BBP header includes type information that indicates either IP or Signaling. The BBP filter 251 executes filtering processing based on type information included in the BBP header. In an example of FIG. 13, LLS packet type information solely indicates Signaling, and other packets indicate IP. Accordingly, the LLS packets will solely be supplied to the SGDU filter bank 255.

The IP header includes an IP address. The IP filter 252 executes filtering processing based on the IP address included in the IP header. In an example of FIG. 13, among the packets with the IP header, the IP address of NTP packet is different, but the other packets have a same IP address.

Furthermore, the UDP header includes a port number. The UDP filler 253 executes filtering processing based on the port number included in the UDP header. In an example of FIG. 13, the port number of each packet to which the UDP header has been attached is different from each other. The LCT header is attached to a packet transmitted by using the FLUTE session. The RTP header is attached to a packet transmitted by using the RTP session. The filtering processing using the IP address and the port number is executed by the IP filter 252 and the UDP filter 253. With this processing, the NTP packet to which no LCT header is attached will be output to the clock generator 214. Each of the packet of video data and the packet of audio data, to which the RTP header is attached, is respectively output to the video decoder 215 and the audio decoder 217.

The LCT header includes a transport session identifier (TSI) and a transport object identifier (TOI). In the FLUTE session, a particular file is defined by using the identification information. The LCT filter 254 executes filtering processing based on the TSI and the TOI included in the LCT header. In an example of FIG. 13, when the TSI and the TOI that identify the SCS (SDP) are defined, the LCT filter 254 supplies the packets of the SCS (SDP) to the SGDU filter bank 255. The LCT filter 254 outputs a packet of various types of file data to the FLUTE processing unit 220 according to the TSI and the TOI included in the LCT header.

The LLS packet and the SCS packet are supplied to the SGDU filter bank 255. The SGDU filter bank 255 executes filtering processing based on the SGDU header attached to those packets. However, in the SGDU filter bank 255, a selected packet that meets a filter condition is retained in a buffer memory in the SGDU filter bank 255, and the retained packet is then intermittently copied by software to the CPU (the CPU 901 in FIG. 28). For example, in the SGDU header, version information (fragment Version in FIG. 17) has been described. Accordingly, only in a case where the version is changed, it is possible to pass an SDP packet. With this configuration, the LLS packet is output onto the control signal processing unit 222, and the SCS packet is output onto the FLUTE processing unit 220. Note that it is possible to configure such that the SCS packets is output directly to the control signal processing unit 222, without passing through the FLUTE processing unit 220.

Moreover, for packets of SCS (SDP), various types of file data, video data and audio data, to be a same service channel, a same IP address has been assigned. Accordingly, the IP filter 252 can output those packets together with NTP packets, onto the service package unit 224.

For example, in an above-described example of FIG. 8, by executing filtering processing with OR condition of an IP address (IP_address="Aa") of the service A, an IP address (IP_address="As") of the shared service S, and an IP address (fixed IP address) of the NTP, it is possible to collectively package those services and the time information (NTP). Although not illustrated in FIG. 13, it is possible to include the electronic service guide (ESG) in a package by executing filtering processing with the four IP addresses that includes the above-described IP addresses of the OR conditions and the IP address of the ESG.

<3. Signaling Information>

Next, signaling information to be transmitted by digital broadcasting of the IP transmission scheme to which the present technique has been applied will be described.

<(1) Data Structure of LLS (SCT and SAT)>

(Syntax of SCT)

FIG. 14 is a diagram illustrating syntax of an SCT. Note that, among elements and attributes illustrated in FIG. 14, "@" is attached to each of the attributes. Also note that indented elements and attributes are defined with respect to their higher order elements.

As illustrated in FIG. 14, an set element includes a networkId attribute, a name attributes, and a BBPStream element. The networkId attribute defines a network identifier (network_id) of a network of a broadcaster on a per-physical-channel basis. The name attribute defines a name of the broadcaster on a per-physical-channel basis.

The BBPStream element, which is a child element of the set element, defines information regarding the BBP stream. The BBPStream element includes a BBPStreamId attribute, a payloadType attribute, a name attribute, an ESGBootstrap element, and a Service element.

The BBPStreamId attribute defines a BBP stream identifier (BBP_stream_id). In a case where the plurality of BBP streams is arranged, the BBP streams are identified by the BBPStreamId attribute. The payloadType attribute defines a payload type of the BBP stream. Exemplary payload types to be defined include "ipv4", "ipv6", and "ts". The name attribute defines a BBP stream name.

The ESGBootstrap element is a child element of the BBPStream element and defines access information to the ESG. The ESGBootstrap element includes a sourceIPAddress attribute, a destinationIPAddress attribute, a portNum attribute, and a tsi attribute.

Each of the sourceIPAddress attribute and the destinationIPAddress attribute defines an IP address of a source and an IP address of a destination for transmission of the ESG, respectively. The portNum attribute defines a port number used for transmit of the ESG. The tsi attribute defines a TSI in the FLUTE session for transmission of the ESG.

The Service element is a child element of the BBPStream element and defines information regarding a service. The Service element includes a serviceId attribute, a serviceType attribute, an SCSBootstrap element, and an AdjunctService element.

The serviceId attribute defines a service identifier (service_id). In a case where a plurality of services is arranged, the services are identified by the serviceId attribute. The serviceType attribute defines type information of the service. The exemplary type information to be defined includes "tv", "audio", "data", "nrt", "esg", "adjunct-nrt", and "adjunct-shared".

The SCSBootstrap element is a child element of the Service element and defines access information to the service channel. The SCSBootstrap element includes a sourceIPAddress attribute, a destinationIPAddress attribute, a portNum attribute, and a tsi attribute.

Each of the sourceIPAddress attribute and the destinationIPAddress attribute defines an IP address of a source and a destination for transmission of the service, respectively. The portNum attribute defines a port number for transmission of the SCS. The tsi attribute defines a TSI in the FLUTE session for transmission of the SCS.

The AdjunctService element is a child element of the Service element and defines information regarding a related adjunct service. The AdjunctService element includes a networkId attribute, a BBPStreamId attribute, the serviceId attribute, and the serviceType attribute.

The networked attribute defines a network identifier (network_id). The BBPStreamId attribute defines a BBP stream identifier (BBP_stream_id). The serviceId attribute defines a service identifier (service_id, hereinafter, also referred to as "Adjunct_service_id"). The serviceType attribute defines service type information. The exemplary type information to be defined includes "adjunct-nrt" and "adjunct-shared".

A data structure of the SCT described with reference to FIG. 14 is illustrated as an example. It is also possible to employ other data structures. The SCT is described, for example, with a mark-up language such as an XML.

(Syntax of SAT)

FIG. 15 is a diagram illustrating syntax of an SAT. Note that, among elements and attributes illustrated in FIG. 15, is attached to the attributes. Also note that indented elements and attributes are defined with respect to their higher order elements.

As illustrated in FIG. 15, the sat element includes a Service element. The Service element includes the serviceId attribute. The service_id attribute defines a service identifier (service_id) for the service on the air. In a case where a plurality of services on the air exists, a plurality of service_id that corresponds to each of the services is arranged.

A data structure of the SAT described with reference to FIG. 15 is illustrated as an example. It is also possible to employ other data structures. The SAT is described, for example, with a mark-up language such as the XML.

<(2) Detailed Structure of SCS (SDP)>

An SDP description document includes two portions, namely, a session description portion and a media description portion. In the session description portion, a protocol version, instance generator information, and connection data, or the like, are described. In the media description portion, a plurality of pieces of media information can be described.

FIG. 16 indicates an exemplary description of the SDP.

In FIG. 16, "v" represents a protocol version. The value to be defined may be "0" or a value determined in service operation.

"o" represents instance generator information. The value to be defined may be a generator name, an SDP instance ID, a version, a transmission (host) type, an IP address type, and an IP address. Exemplary transmission (host) types to be defined include "IN" (Internet), "BC" (broadcast), or "HB" (hybrid). The IP address type to be defined may be "IP4" (IPv4) or "IP6" (IPv6).

"s" represents a session name. For this value, the session name is described in a text.

"c" represents connection data. This value to be defined may include a network type of a session, IP address type, and the IP address. An exemplary network types of a session defined include "IN" (Internet), "BC" (broadcast), or "HB" (hybrid). The IP address type to be defined may be "IP4" (IPv4) or "IP6" (IPv6).

The "a" to be defined may include a service and an adjunct_service. The service defines an identifier of an own service (service_id). The adjunct_service defines an identifier of the shared service (Adjunct_service_id).

"m" represents media information. Exemplary values to be defined include a media type, port number for transmission of the media, a protocol and format for transmitting the media. Exemplary media types to be defined include Video and Audio. Exemplary protocols to be defined for transmitting the media include FLUTE/UDP and RTP/AVP. As a format, additional information will be described for each protocol whenever necessary. Note that the line beginning with "a=" represents an attribute of corresponding media.

The exemplary description in FIG. 16 illustrates a case of a service in which the video data and the audio data transmitted in the RTP session are established in a unit of stream.

In this example, the line of "m=video" indicates that a port No. of the video data transmitted in the RTP session is 8000. With the next line "a=rtpmap", the payload type and the encoding type are mapped. Herein, the video data is encoded with H.264. This line also indicates that, in the video data, a time scale of an RTP time stamp is 90000.

In this example, the line of "m=audio" indicates that a port number of the audio data transmitted in the RTP session is 7000.

(SGDU Configuration in IP Transmission Scheme)

FIG. 17 is a diagram illustrating a configuration of the SGDU in the IP transmission scheme.

As illustrated in FIG. 17, the service guide delivery unit (SGDU) is formed with header information (Unit_Header) and a payload (Unit_Payload). In the SGDU, extension information (extension_data) is arranged as required.

As the header information, a fragmentTransportID and a fragmentVersion are arranged. The fragmentTransportID represents fragment identification. For example, the SCT, the SDP, or the like, is identified by the fragmentTransportID. The fragmentVersion represents a version number of the fragment.

As the payload, actual data of at least one of an XML fragment and an SDP fragment are arranged. In other words, data of one or more fragments according to the number defined by n_o_service_guide fragments of the header information are to be arranged as the payload. Herein, it is possible to use any combination of the plurality of fragments to be arranged as the payload. It is possible, for example, to arrange both the XML fragment and the SDP fragment. In addition, an offset included in the header information can indicate a position of any fragment among the plurality of arranged fragments.

Note that when the XML fragment is arranged, fragmentType indicating the type of fragment is arranged together with the actual data. Note that when the SDP fragment is arranged, fragmentID indicating the identification of the fragment is arranged together with the actual data.

In addition, when extended information is arranged, extension_type indicating the type of extended information is arranged together with the extended data. By defining extension_offset as the header information, it is possible to indicate a position of the extended information.

<4. Operation Examples>

Next, operation examples of the broadcast system in which the present technique is applied will be described.

<(1) Direct Channel Selection of Shared Service>

First, with reference to FIGS. 18 to 20, direct channel selection processing of the shared service executed in a case where a viewer directly selects a particular channel (service) by operating a remote controller, or the like, will be described. Note that this operation example is used to describe mainly the channel selection processing on the reception device 20, and accordingly, it is assumed that channel selection information (SCTs) has already been obtained with initial scanning processing, or the like.

Figure 18:
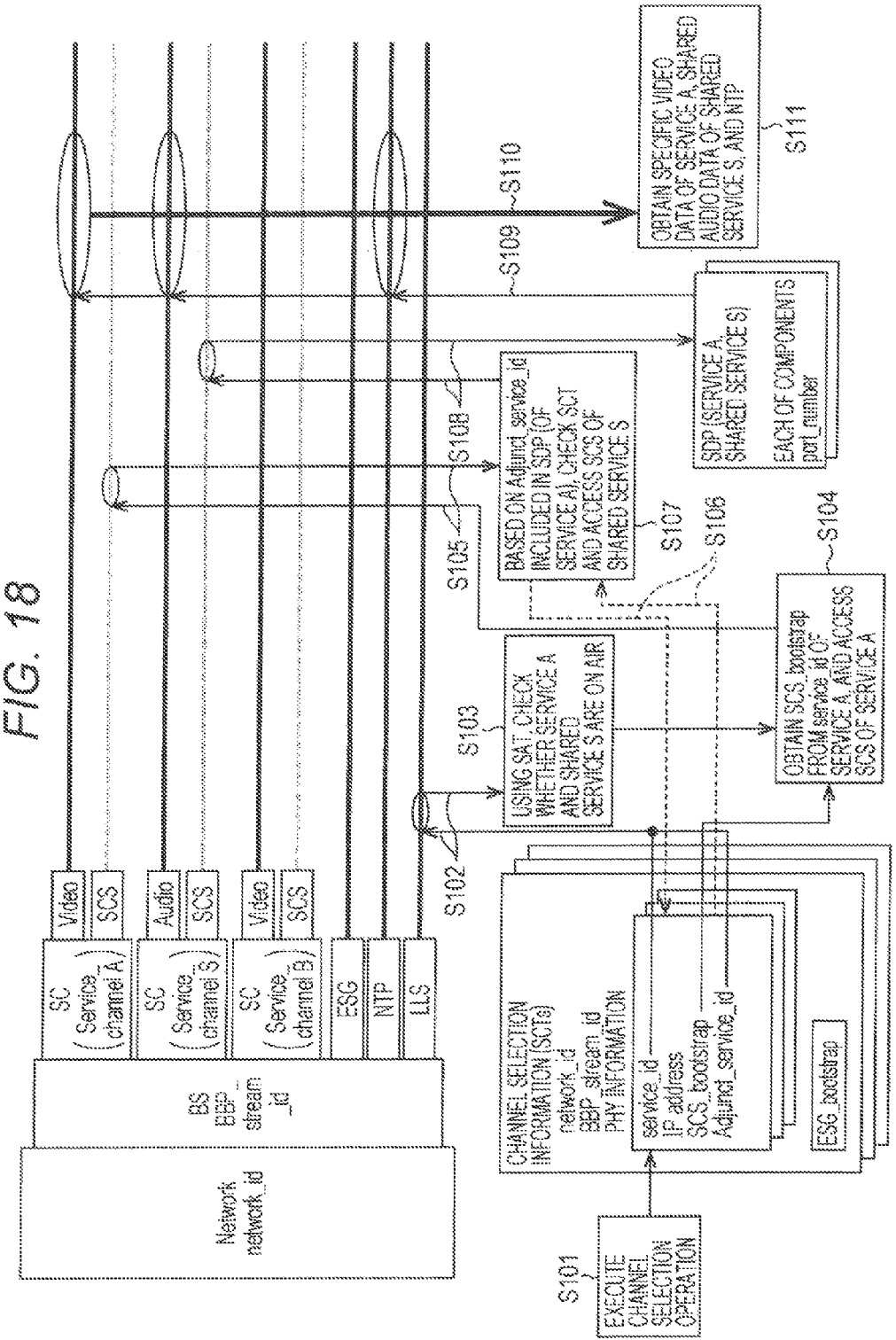
FIG. 18 is a diagram illustrating direct channel selection processing of a shared service.

FIG. 18 is a diagram illustrating the direct channel selection processing of the shared service.

As illustrated in FIG. 18, a broadcast wave of the digital broadcasting using the IP transmission scheme, transmittal from the transmission device 10, is used to transmit the video data and the audio data in a synchronous stream format. Accordingly, the transmission uses the RTP session. The SCS is transmitted in the FLUTE session. In addition, each of the service A (Service_channel A) and the service B (Service_channel B) provides specific video data. The related audio data are shared with the two services and are provided by the shared service S (Service_channel S).

When the reception device 20 detects channel selection operation of the service A by a viewer, the channel selection information (SCTs) stored in the NVRAM 223 is read (S101). The reception device 20 obtains an SAT transmitted as an LLS in a predetermined transmission cycle (S102). Subsequently, service_id of the service A selected by the viewer, service_id of the shared service S related to the service A, Adjunct_service_id of a service included in the SAT, are verified so as to check whether each of the service A and the shared service S is on the air (S103).

When both the service A and the shared service S are on the air, the reception device 20 accesses the SCS of the service A transmitted by the FLUTE session and obtains the SDP by using SCS_bootstrap information that corresponds to the service_id of the selected service A included in the channel selection information (SCTs) (S104 and S105).

In addition, the reception device 20 identifies, from the channel selection information (SCTs), the service_id that corresponds to the Adjunct_service_id included in the SDP of the service A, and then, obtains SCS_bootstrap information of the identified service_id (S106). The SCS_bootstrap information is information to be used for obtaining the SCS of the shared service S. The reception device 20 access the SCS of the shared service S transmitted by the FLUTE session and obtains SDP by using SCS_bootstrap information that corresponds to the service_id of the shared service S (S107 and S108). The present example is a case where the service_id of the shared service S is identified by using both the SCT and the SDP. Alternatively, it is possible to use the SCT solely to identify the service_id of the shared service S because the SCT includes the Adjunct_service_id.

At this point, two SDPs, namely, one for the service A and another for the shared service S, have been obtained. The SDP includes component attributes and configuration information such as a port number of each of the components. In the present example, a port number of the video data of the service A is described in the SDP of the service A, and a port number of the related shared audio data is described in the SDP of the shared service S.

Accordingly, the reception device 20 can obtain the video data of the service A and the audio data of the shared service S, transmitted by the RTP session, by using the port numbers included in each of SDPs (S109 to S111). Moreover, a fixed IP address has been given to the NTP. Accordingly, by using the information, it is possible to obtain time information (NTP) common to a plurality of services. The video data and the audio data obtained in this manner are decoded according to a clock signal based on the NTP.

Figure 19:
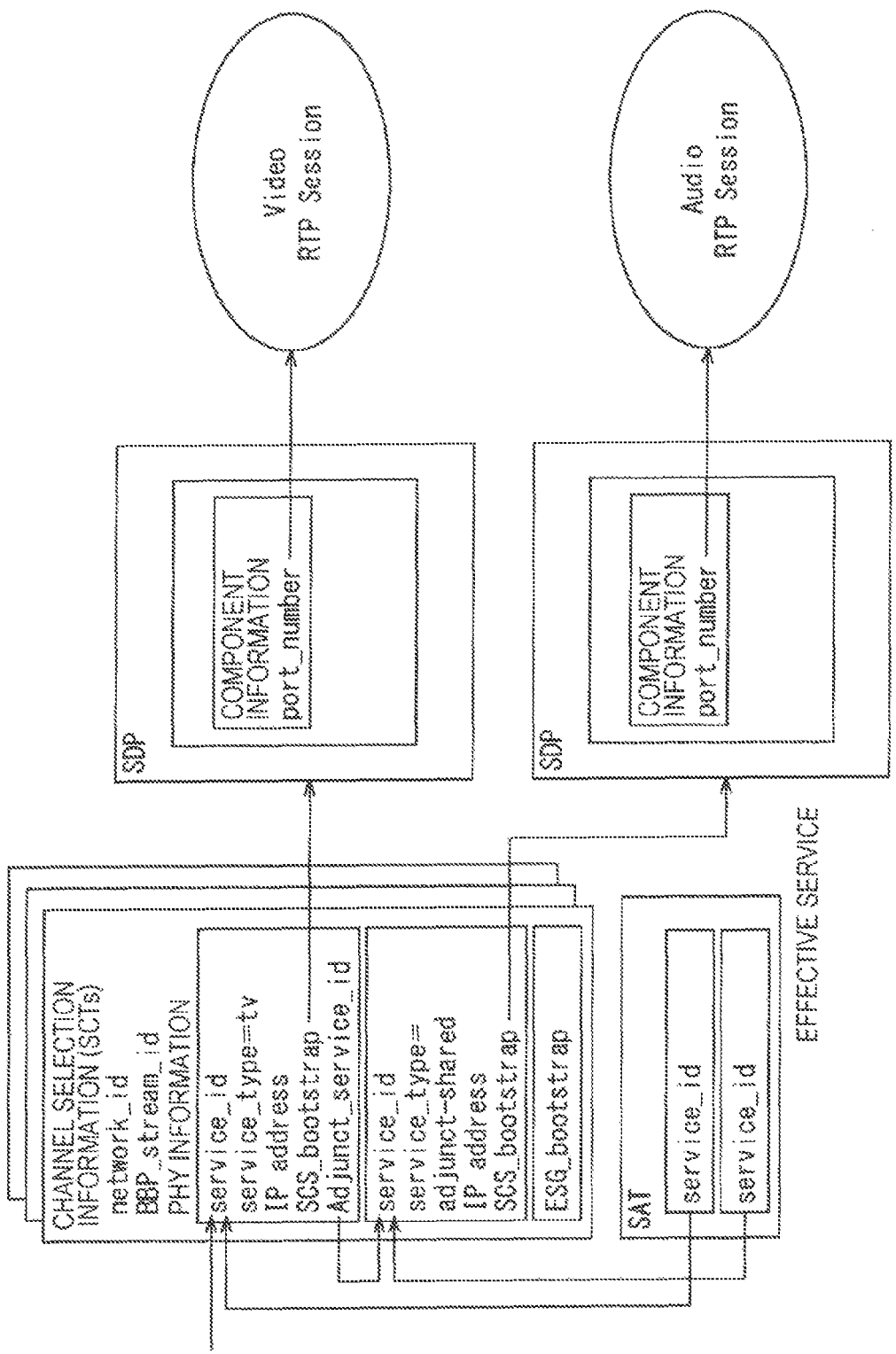
FIG. 19 is a diagram illustrating a relationship of control signals obtained at the time of direct channel selection processing of the shared service.

With reference to FIG. 19, a relationship of control signals obtained at direct channel selection processing of the shared service will be described.

As illustrated in FIG. 19, when the service A is selected by operation of a remote controller, or the like, a service_id of the service A included in the channel selection information (SCTs) and a service_id of the shared service S related to the service A, are verified against service_ids included in the SAT. Subsequently, when the service A and the shared service S are on the air, the SDP of the service A transmitted by the FLUTE session is obtained by using SCS_bootstrap information of the service A included in the channel selection information (SCTs). In addition, the SDP of the shared service S transmitted by the FLUTE session is obtained by using the SCS_bootstrap information of the shared service S included in the channel selection information (SCTs).

In this manner, two SDPs are obtained. Accordingly, video data is obtained from the RTP session of the service A by using component information (port number) included in one SDP, and video data is obtained from the RTP session of the shared service S by using component information (port number) included in the other SDP.

Figure 20:
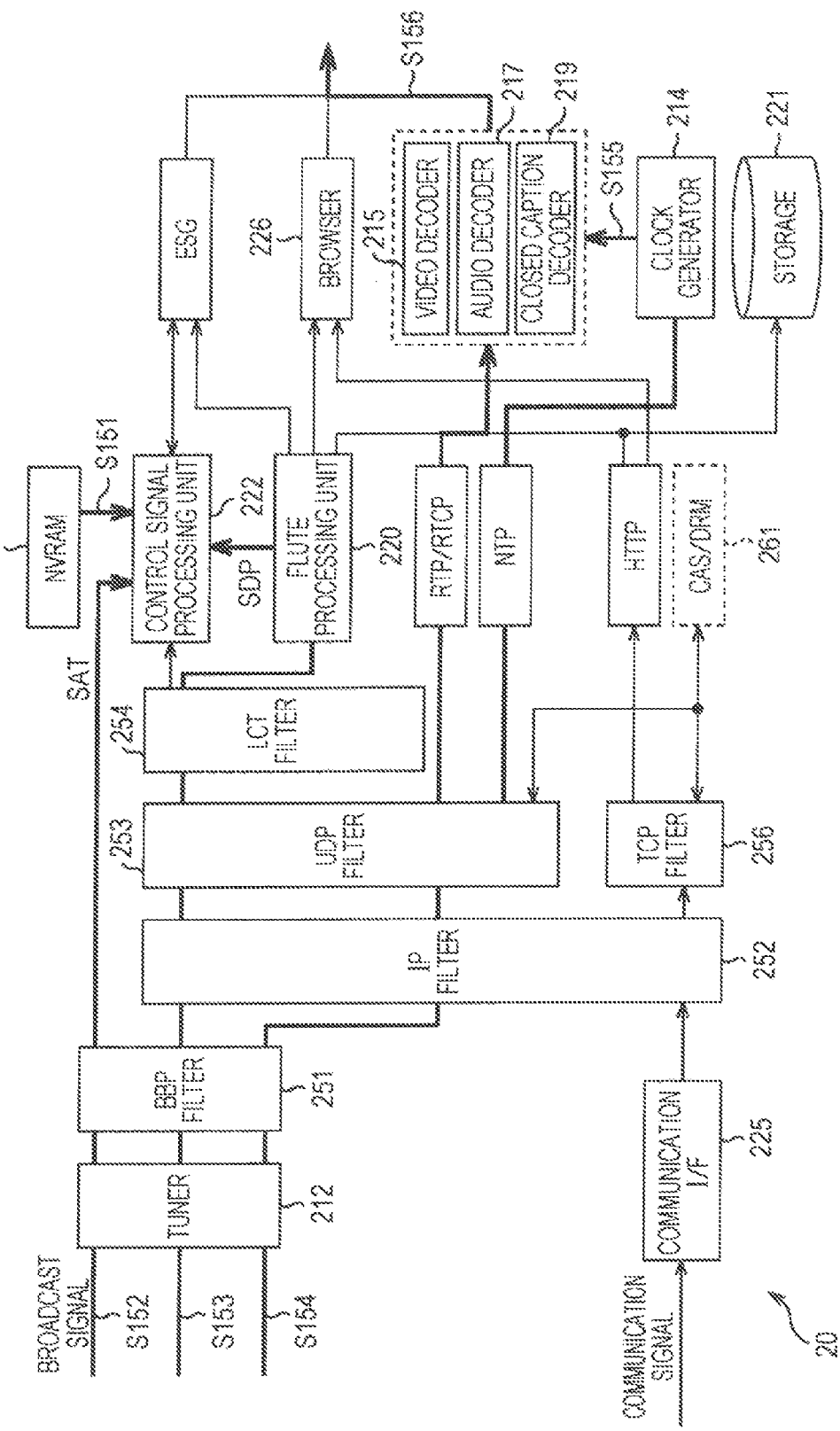
FIG. 20 is a diagram illustrating operation of each of units of the reception device at the time of direct channel selection processing of the shared service.

FIG. 20 is a diagram illustrating operation of each of units of the reception device 20 at the time of direct channel selection for the shared service.

As illustrated in FIG. 20, on the reception device 20 at the time of direct channel selection for the shared service, the control signal processing unit 222 reads and obtains channel selection information (SCTs) stored in the NVRAM 223 (S151). The tuner 212, based on the control from the control signal processing unit 222, executes channel selection processing according to the channel selection information. In addition, the control signal processing unit 222 obtains the SAT extracted by filtering processing executed by the BBP filter 251 and the SGDU filter bank 255 (not illustrated) and determines whether the service A selected by the viewer and the shared service S related to the service A are on the air (S152).

Subsequently, when the service A and the shared service S are on the air, filtering processing using the IP address, the port number, the TSI, or the like, is executed by the IP filter 252 and the SGDU filter bank 255. Accordingly, the SDP is obtained from the FLUTE session by the FLUTE processing unit 220 (S153). With this processing, the control signal processing unit 222 obtains the SDP of the service A and the SDP of the shared service S from the FLUTE processing unit 220.

In the example of FIG. 20, components are transmitted in the RTP session. Accordingly, the IP filter 252 and the UDP filter 253 execute filtering processing using the IP address and the port number, and then supply the NTP, the video data, the audio data, respectively, to the clock generator 214, the video decoder 215, and the audio decoder 217 (S154).

The clock generator 214, based on the NTP from the UDP filter 253, generates a clock signal, and supplies the clock signal to the video decoder 215 and the audio decoder 217 (S155). The video decoder 215, based on the clock signal from the clock generator 214, decodes the video data from UDP filter 253, and supplies the decoded video data to the video output unit 216 (not illustrated) (S156). The audio decoder 217, based on the clock signal from the clock generator 214, decodes the audio data from the UDP filter 253, and supplies the decoded audio data to the audio output unit 218 (not illustrated) (S156). With this processing, the image of the service A corresponding to the TV program directly selected by the viewer is displayed on the display, and the sound of the shared service S corresponding to the image is output from the speaker.

As described above, in execution of the direct channel selection of the shared service, a particular service and a shared service related to the particular service are treated as separate services, and the IP address is assigned on a per-service basis. Accordingly, the shared service can also be handled on a per-service basis. With this configuration, it is possible to flexibly support various operation modes in digital broadcasting using the IP transmission scheme.

In FIG. 20, a TCP filter 256 is a filter for a transmission control protocol (TCP). A CAS/DRM 261 executes processing related to a copyright of content.

<(2) Recording/Reproduction Corresponding to Shared Service>

(2-1) ESG Recording Reservation/Execution

Figure 21:
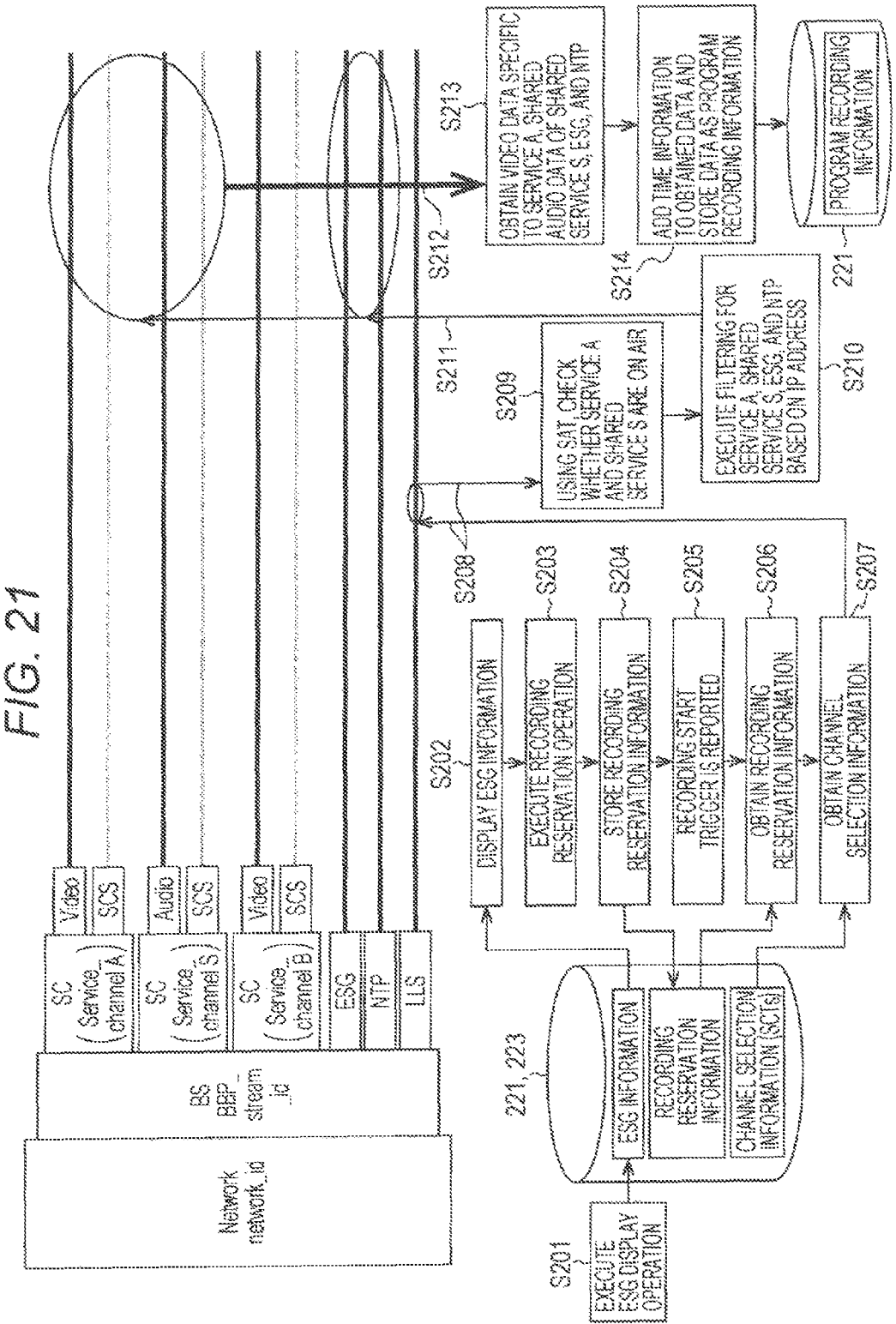
FIG. 21 is a diagram illustrating ESG recording reservation/execution processing.
Figure 22:
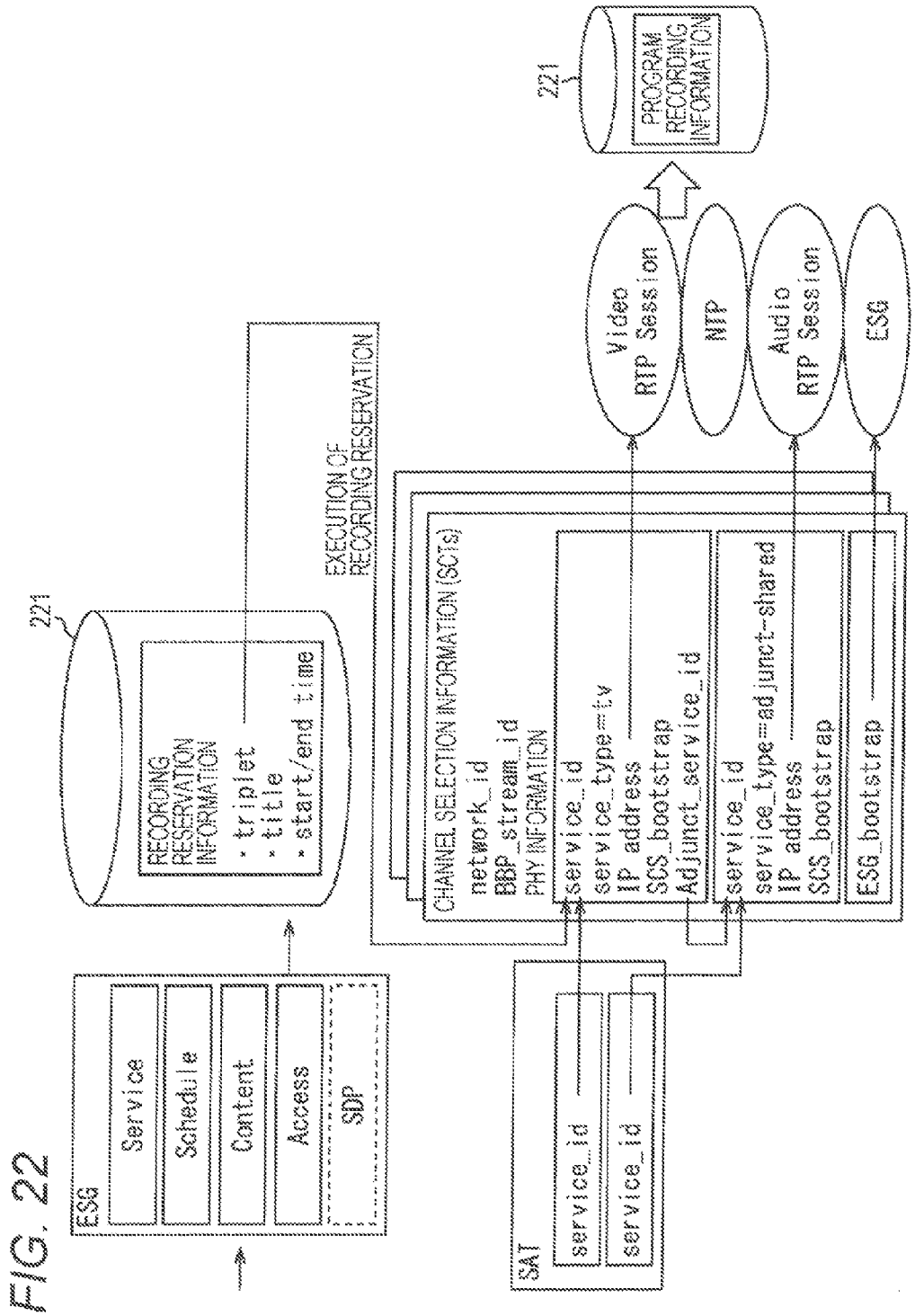
FIG. 22 is a diagram illustrating a relationship of the control signals obtained at the time of the ESG recording reservation/execution.
Figure 23:
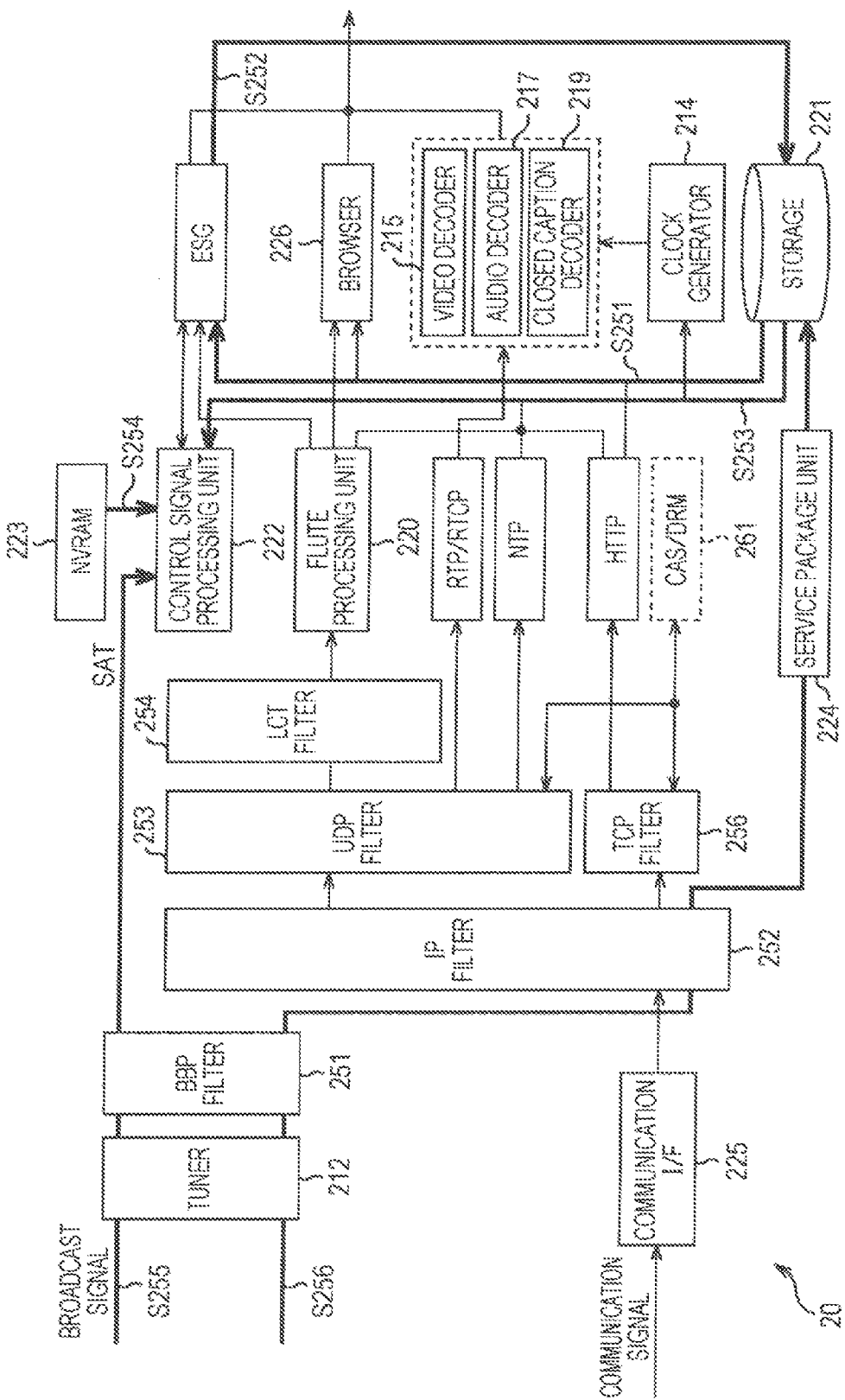
FIG. 23 is a diagram illustrating operation of each of units of the reception device at the time of ESG recording reservation/execution.

With reference to FIGS. 21 to 23, ESG recording reservation/execution processing executed in a case where the viewer performs, using a remote controller, or the like, receding reservation of a particular service from the electronic service guide (ESG) will be described. In this operation example, however, ESG recording reservation/execution on the reception device 20 will mainly be described. Accordingly, it is assumed that ESG information has been obtained by ESG acquisition processing to be executed at the time of power off, or the like, of the reception device 20.

FIG. 21 is a diagram illustrating ESG recording reservation/execution processing.

As illustrated in FIG. 21, a broadcast wave of the digital broadcasting using the IP transmission scheme, transmitted from the transmission device 10, is used to transmit the video data and the audio data in a synchronous stream format. Accordingly, the transmission uses the RTP session. The SCS is transmitted in the FLUTE session. In addition, each of the service A (Service_channel A) and the service B (Service_channel B) provides specific video data. The related audio data are shared with the two services and are provided by the shared service S (Service_channel S).

On the reception device 20, when display operation of the electronic service guide by the viewer is detected, ESG information is read from the storage 221, and a service list of the electronic service guide (ESG information) is displayed on a display (S201 and S202). Using the service list displayed on the display, the viewer selects a particular service for which the viewer desires to perform recording reservation. The reception device 20, when it has detected selection operation of the service A by the viewer, for example, stores on the storage 221 recording reservation information of the service A corresponding to the selection operation (S203 and S204).

Subsequently, on the reception device 20, a recording start trigger is reported immediately before the starling time of recording reservation of the service A (S205). In response to the recording start trigger, the reception device 20, reads recording reservation information and channel selection information (SCTs) of the service A, respectively, from the storage 221 and the NVRAM 223 so as to perform channel selection processing (S206 and S207).

The reception device 20 obtains an SAT transmitted as an LLS in a predetermined transmission cycle (S208). Subsequently, a service_id of the service A selected by the viewer, a service_id of the shared service S related to the service A, and a service_id of a service included in the SAT, are verified with each other so as to check whether each of the service A and the shared service S is on the air (S209).

In a case where the service A and the shared service S are on the air, the reception device 20 executes filtering processing using the IP address described in the channel selection information (SCTs) (S210). By the filtering processing, a component (specific video data) and a control signal (SCS) of the service A, a component (shared audio data) and a control signal (SCS) of the shared service S, the electronic service guide (ESG), and the time information (NTP) are obtained (S211 to S213). In the present example, the service A, the shared service S, the ESG, and the NTP have different IP addresses. Accordingly, the data for the above four are obtained by executing filtering using the four IP addresses.

Subsequently, pieces of information including components (the video data of the service A and the audio data of the shared service S), control signals (the SDP for each of the services), the electronic service guide (ESG), the time information (NTP) are packaged and then stored in the storage 221 as program recording information that corresponds to the service A (S214). Note that it is configured such that time information based on the NTP is added to the program recording information when it is stored in the storage 221. The program recording information may be stored in a packaged state into the storage 221 or may be stored after being arranged in a file.

With reference to FIG. 22, a relationship of the control signals obtained at the time of the ESG recording reservation/execution will be described.

As illustrated in FIG. 22, when the service A is selected from the ESG information, a triplet corresponding to the service A (triplet), a title of the recorded program (title), recording start time (start time), and recording end time (end time), or the like, are stored in the storage 221 as recording reservation information. When the recording start time has come, the recording reservation information and the channel selection information (SCTs) of the service A are obtained and channel selection processing is executed. In addition, the SAT transmitted in a predetermined transmission cycle as an LLS is obtained, and it is determined whether the service A and the shared service S related to the service A are on the air.

When the service A and the shared service S are on the air, filtering processing using the IP addresses of these services is executed. With this processing, a component (specific video data) of the service A and a component (shared audio data) of the shared service S, transmitted in the RTP session, are obtained. It is also possible, from the channel selection information (SCTs), to identify the IP address for the NTP. Accordingly, by executing filtering processing using the identified IP address, it is possible to obtain the time information (NTP). Moreover, by executing filtering processing using the IP address of the ESG_bootstrap information included in the channel selection information (SCTs), it is possible to obtain the electronic service guide (ESG).

In this manner, pieces of information such as the component (Audio/Video), the control signal (SCS), the time information (NTP) and the electronic service guide (ESG), obtained by filtering processing using the IP addresses, are packaged and stored in the storage 221 as program recording information that corresponds to the service A.

FIG. 23 is a diagram illustrating operation of each of units of the reception device 20 at the time of the ESG recording reservation/execution.

As illustrated in FIG. 23, on the reception device 20 at the time of the ESG recording reservation/execution, the ESG information is read from the storage 221, and a service list of the electronic service guide is displayed on the display (S251). When the service A is selected from the service list displayed on the display by the viewer, the reception device 20 stores into the storage 221 the recording reservation information of the service A corresponding to the selection operation (S252).

Thereafter, when the recording start trigger is reported, the control signal processing unit 222 reads the recording reservation information and the channel selection information (SCTs) of the service A, respectively, from the storage 221 and from the NVRAM 223 (S253 and S254). With this configuration, the tuner 212, based on control from the control signal processing unit 222, executes channel selection processing according to the recording reservation information and the channel selection information (SCTs) of the service A. The control signal processing unit 222 obtains the SAT extracted by filtering processing by the BBP filter 251 and the SGDU filter bank 255 (not illustrated) and determines whether the service A selected by the viewer and the shared service S related to the service A are on the air (S225).

Subsequently, in a case where the service A and the shared service S are on the air, filtering processing by the IP filter 252 is executed using the IP address. With this processing, a component of the service A (specific video data), a component of the shared service S (shared audio data), a control signal (SCS), time information (NTP), and the electronic service guide (ESG) are extracted and supplied to the service package unit 224. The service package unit 224 packages the component from the IP filter 252, the control signal (SCS), the time information (NTP), and the electronic service guide (ESG), and stores them in the storage 221 as program recording information that corresponds to the service A (S256).

In this manner, the information including components forming the service A and the shared service S related to the service A, to which recording reservation has been executed by the viewer with the ESG recording reservation/execution processing, can be extracted and packaged by filtering processing using the IP address.

(2-2) Reproduction of Recorded Program

Next, recording program reproduction processing to be executed in a case where the program recording information stored in the storage 221 by the above-described ESG recording reservation/execution processing will be described.

Figure 24:
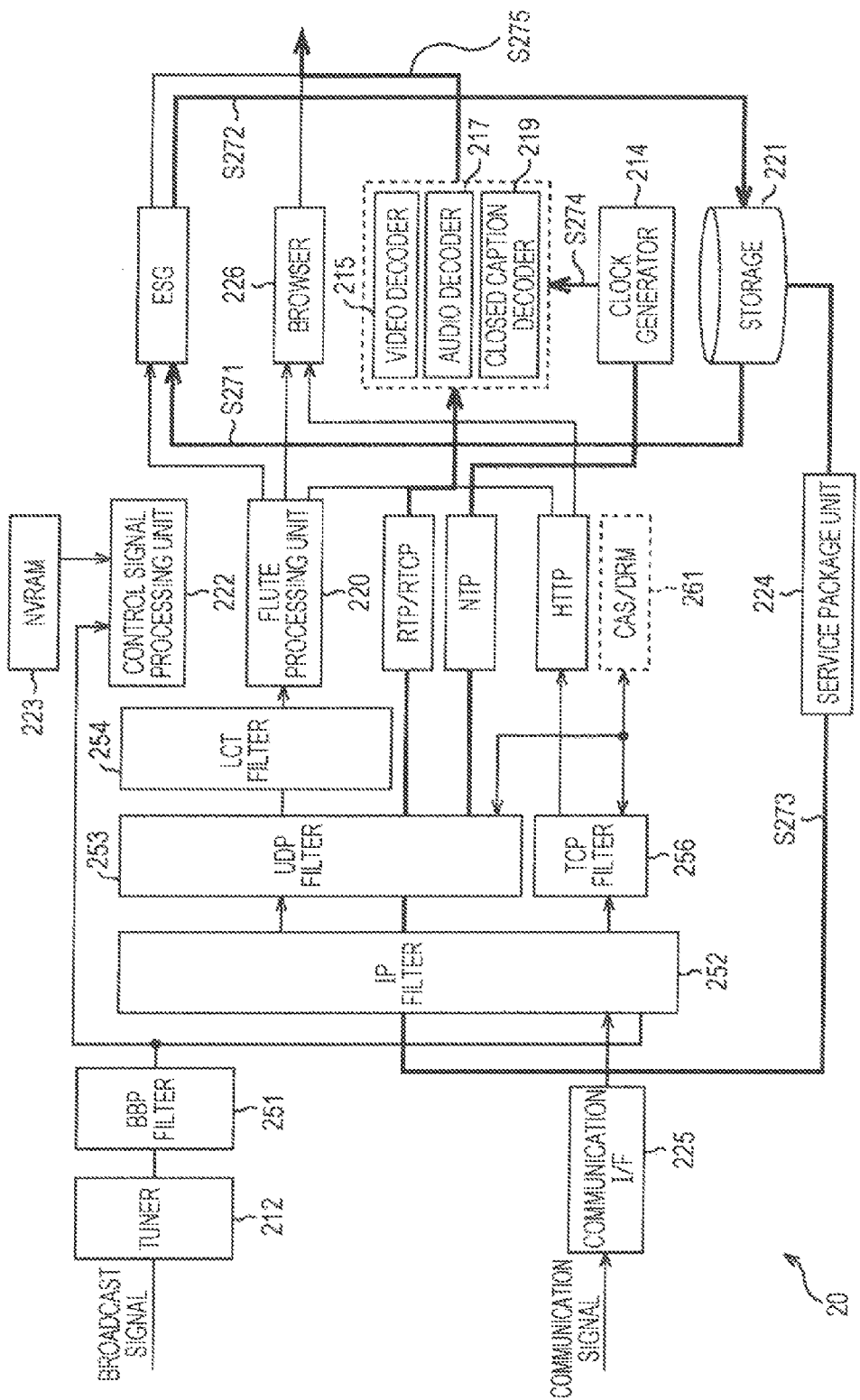
FIG. 24 is a diagram illustrating operation of each of units of the reception device when a recorded program is reproduced.

FIG. 24 is a diagram illustrating operation of each of units of the reception device 20 when a recorded program is reproduced.

On the reception device 20 when the recorded program is reproduced, the ESG information is read from the storage 221, and a service list that corresponds to the program recording information for the recorded program is displayed on the display (S271). In a case where the viewer has selected the service A from the service list, the service package unit 224 reads from the storage 221 the program recording information that corresponds to the service A according to the selection operation (S272 and S273).

The service package unit 224 depackages the program recording information that corresponds to the service A read from the storage 221 and obtains components of the packaged service A (specific video data), components of the packaged shared service S (shared audio data), the control signal (SCS), the time information (NTP), and the electronic service guide (ESG) (S273). The information is supplied to the IP filler 252.

In the example of FIG. 24, components are transmitted in the RTP session. Accordingly, the IP filter 252 and the UDP filter 253 execute filtering processing using an IP address and a port number, and supplies an NTP, video data, audio data, respectively, to the clock generator 214, the video decoder 215, and the audio decoder 217 (S273).

The clock generator 214, based on the NTP from the UDP filter 253, generates a clock signal and supplies the clock signal to each of the video decoder 215 and the audio decoder 217 (S274). Based on the clock signal from the clock generator 214, the video decoder 215 decodes the video data from UDP filter 253 and supplies the decoded video data to the video output unit 216 (not illustrated)

(S275). Based on the clock signal from the clock generator 214, the audio decoder 217 decodes the audio data from the UDP filter 253 and supplies the decoded audio data to the audio output unit 218 (not illustrated) (S275).

With this configuration, the image of the service A that corresponds to the TV program that the viewer has reserved for recording from the service list is displayed on the display, and the sound of the shared service S that corresponds to the image is output from the speaker.

In this manner, with recording program reproduction processing, it is possible to reproduce the components of the service A and the shared service S by using the components and control information packaged by the ESG recording reservation/execution processing.

As described above, in recording/reproduction corresponding to the shared service, it is possible to store a particular service and a shared service related to the particular service in a same package and to reproduce the stored package, by executing filtering processing using an IP address. Accordingly, it is possible to flexibly support various operation modes in digital broadcasting using the IP transmission scheme.

<5. Specific Processing Executed, on Each of Devices>

Figure 25:
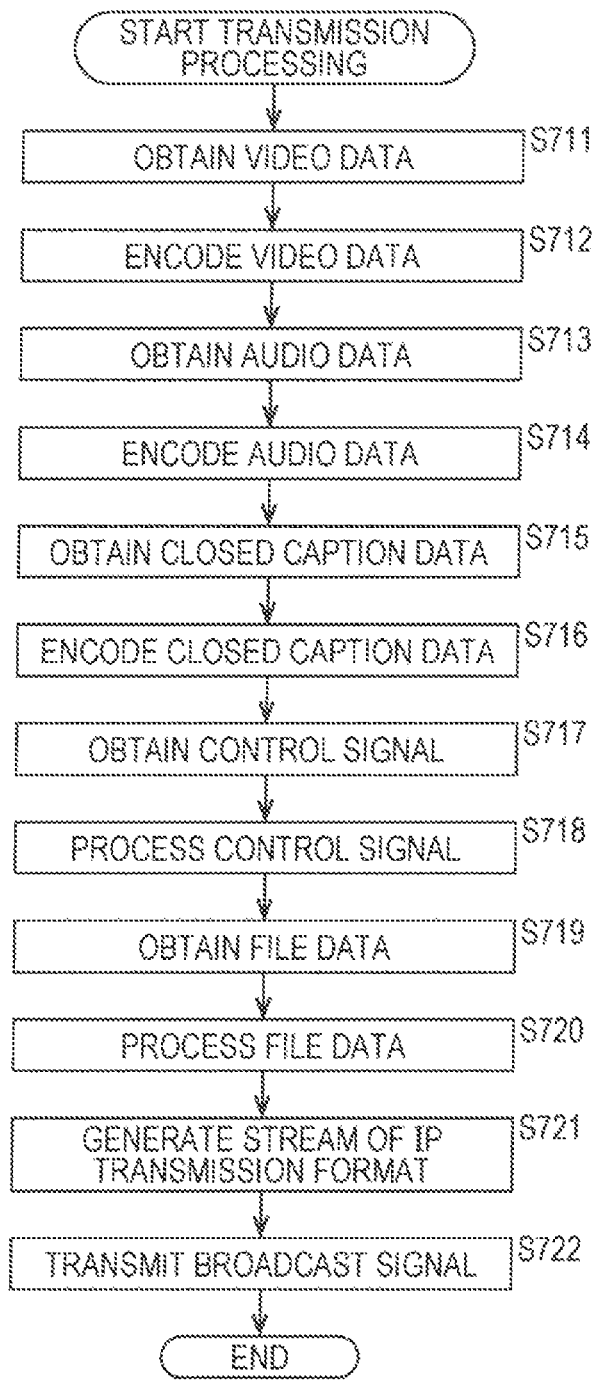
FIG. 25 is a flowchart illustrating transmission processing.
Figure 26:
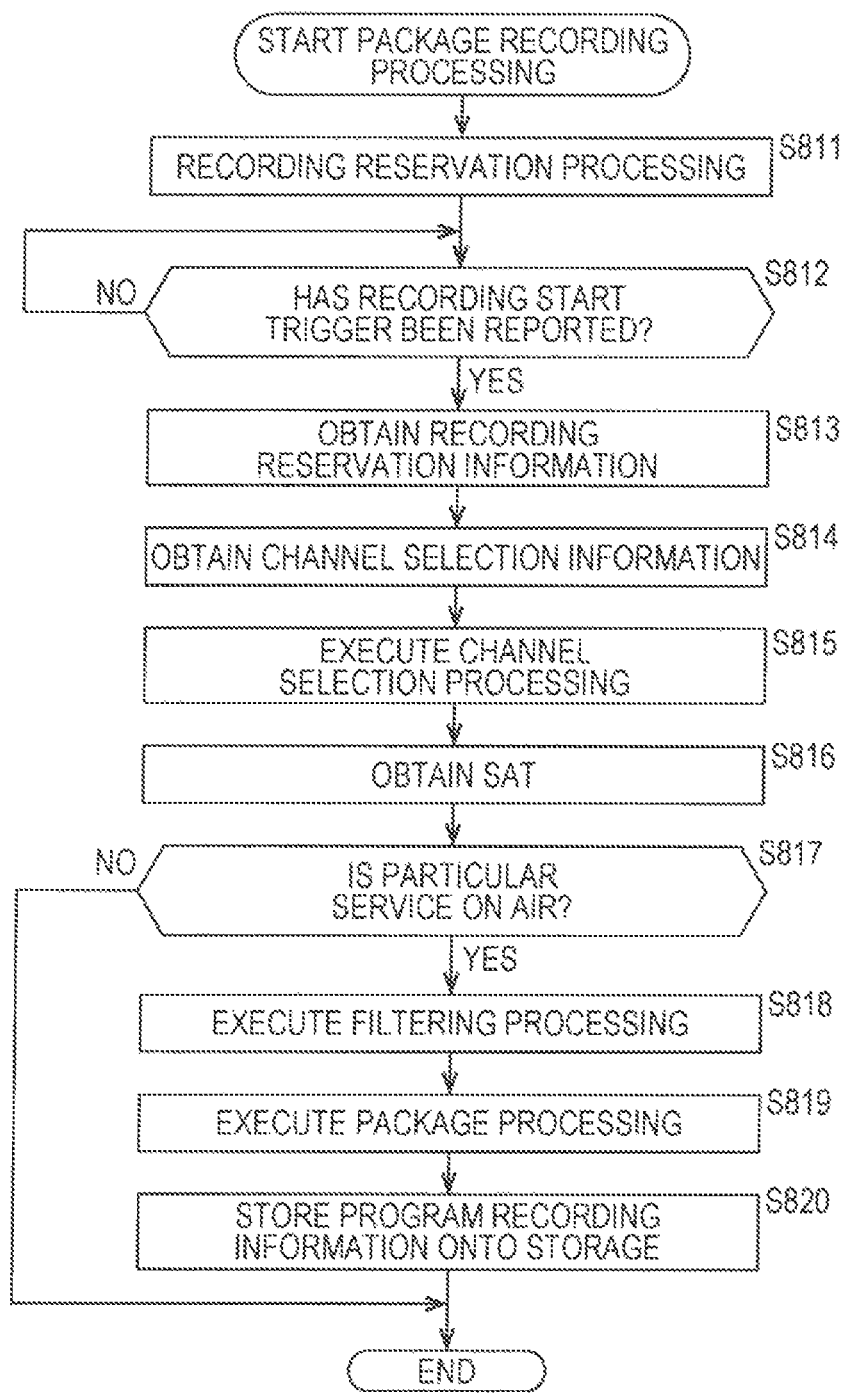
FIG. 26 is a flowchart illustrating package recording processing.
Figure 27:
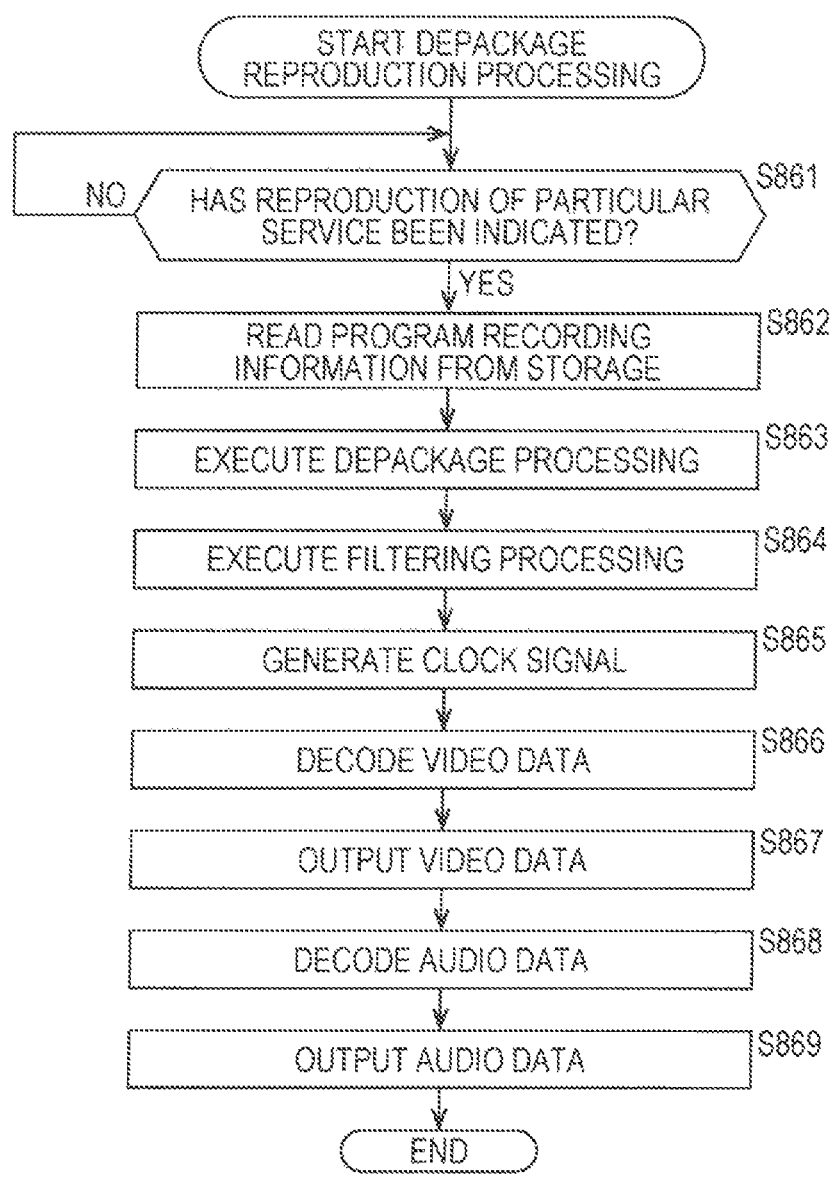
FIG. 27 is a flowchart illustrating depackage reproduction processing.

Next, processing to be executed in each of devices configuring the broadcast system 1 in FIG. 10 will be described specifically with reference to FIGS. 25 to 27.

(Transmission Processing)

First, transmission processing executed by the transmission device 10 in FIG. 10 will be described with reference to a flowchart in FIG. 25.

In step S711, the video data acquisition unit 111 obtains video data and supplies it to the video encoder 112. In step S712, the video encoder 112 encodes the video data supplied from the video data acquisition unit 111 and supplies the encoded data to a Mux 121.

In step S713, the audio data acquisition unit 113 obtains audio data and supplies it to the audio encoder 114. In step S714, the audio encoder 114 encodes the audio data supplied from the audio data acquisition unit 113, and supplies the encoded data to the Mux 121.

In step S715, the closed caption data acquisition unit 115 obtains closed caption data and supplies it to the closed caption encoder 116. In step S716, the closed caption encoder 116 encodes the closed caption data supplied from the closed caption data acquisition unit 115, and supplies the encoded data to the Mux 121.

In step S717, the control signal acquisition unit 117 obtains control signals such as LLS and an SCS and supplies the signal to the control signal processing unit 118. In step S718, the control signal processing unit 118 executes predetermined signal processing on the control signal supplied from the control signal acquisition unit 117 and supplies the signal to the Mux 121. For example, the control signal processing unit 118 executes signal processing needed for transmission in the FLUTE session, on the SCS obtained by the control signal acquisition unit 117.

In step S719, the file data acquisition unit 119, when it transmits data in an asynchronous file format, obtains file data such as NRT content and an application and supplies the file data to the file processing unit 120. In step S720, the file processing unit 120 executes predetermined file processing on the file data supplied from the file data acquisition unit 119, and supplies the processed data to the Mux 121.

In step S721, the Mux 121 multiplexes video data from the video encoder 112, audio data from the audio encoder 114, closed caption data from the closed caption encoder 116, a control signal from the control signal processing unit 118, and file data from the file processing unit 120 so as to create a BBP stream with the IP transmission format, and supplies the BBP stream to the transmission unit 122.

In step S722, the transmission unit 122 transmits the BBP stream supplied from the Mux 121, as a broadcast signal via an antenna 123. With completion of processing of step S722, transmission processing finishes.

Transmission processing is executed as described above.

(Package Recording Processing)

Next, package recording processing executed by the reception device 20 in FIG. 10 will be described with reference to a flowchart in FIG. 26.

In step S811, recording reservation processing is executed. In the recording reservation processing, as described in ESG recording reservation/execution processing in FIG. 21, in a case where a particular service (the above-described service A, for example) has been selected from the service list according to the ESG information, the program reservation information regarding the service A will be stored in the storage 221.

When the recording reservation processing is finished, the processing moves on to step S812. In step S812, whether a recording start trigger has been reported is determined. After the recording start trigger has been reported, the processing moves on to step S813.

In step S813, the control signal processing unit 222 obtains program reservation information of the service A from the storage 221. In addition, in step S814, the control signal processing unit 222 obtains channel selection information (SCTs) from the NVRAM 223.

In step S815, based on the control from the control signal processing unit 222, the tuner 212 executes channel selection processing.

In step S816, the control signal processing unit 222 obtains the SAT extracted by filtering processing by the BBP filter 251 and by the SGDU filler bank 255. In step S817, the control signal processing unit 222 determines based on SAT whether the service A and the shared service S related to the service A are on the air.

In step S817, when it is determined that the service A and the shared service S are not on the air, the succeeding processing is discontinued, and the package recording processing finishes. In contrast, when it is determined in step S817 that the service A and the shared service S are on the air, the processing moves on to step S818.

In step S818, the IP filter 252 executes filtering processing. By executing filtering processing using an IP address obtained from the channel selection information (SCTs), it is possible to obtain, for example, the component of the service A (specific video data) and the component of the shared service S (shared audio data), transmitted in the RTP session, the control signal (SCS), the time information (NTP), and the electronic service guide (ESG).

In step S819, the service package unit 224 executes package processing for packaging the components, the control signal (SCS), the time information (NTP), and the electronic service guide (ESG), extracted by the IP filter 252.

In step S820, the service package unit 224 stores, in the storage 221, the program recording information of the service A obtained by package processing executed in step S819. With completion of processing in step S820, the package recording processing finishes.

The package recording processing is executed as described above.

(Depackage Reproduction Processing)

Next, depackage reproduction processing executed by the reception device 20 in FIG. 10 will be described with reference to a flowchart in FIG. 27.

In step S861, it is determined whether the viewer has selected a particular service from the list of recorded services according to the ESG information. Herein, for example, the processing moves on to step S862 after the viewer has selected the service A and reproduction of the service A has been indicated.

In step S862, the service package unit 224 reads the program recording information of the service A from the storage 221. In step S863, the service package unit 224 depackages the program recording information of the service A read by the processing m step S862, and obtains components of the packaged service A (specific video data), components of the packaged shared service S (shared audio data), the control signal (SCS), the time information (NTP), and the electronic service guide (ESG) and supplies them to the IP filter 252.

In step S864, each of the IP filter 252 and the UDP filter 253 executes filtering processing using an IP address and a port number, and supplies the NTP, the video data, and the audio data, respectively, to the clock generator 214, the video decoder 215, and the audio decoder 217.

In step S865, based on the NTP supplied from the UDP filter 253, the clock generator 214 generates a clock signal and supplies the clock signal to the video decoder 215 and the audio decoder 217.

In step S866, based on a clock signal supplied from the clock generator 214, the video decoder 215 decodes the vide data supplied from the UDP fitter 253 and supplies the decoded video data to the video output unit 216. In step S867, the video output unit 216 outputs the video data supplied from the video decoder 215 onto a display.

In step S868, based on a clock signal supplied from the clock generator 214, the audio decoder 217 decodes the audio data supplied from the UDP filter 253 and supplies the decoded video data to the audio output unit 218. In step S869, the audio output unit 218 outputs the audio data supplied from the audio decoder 217 onto a speaker.

The video data and the audio data are thus decoded in synchronization with each other according to the clock signal. Accordingly, the sound that corresponds to the TV program image displayed on the display is output from the speaker. The TV program image is displayed based on the video data of the service A, and the sound that corresponds to the image is output based on the audio data of the shared service S. With completion of the processing in step S869, the depackage reproduction processing finishes.

The depackage reproduction processing is executed as described above.

<Description of Computer Utilizing the Present Technique>

A series of processing described above can be executed in hardware or with software. When the series of processing is executed with software, a program included in the software is installed in a computer. Herein, the computer includes a computer incorporated IN a dedicated hardware, and a general-purpose personal computer on which various types of functions can be executed.

Figure 28:
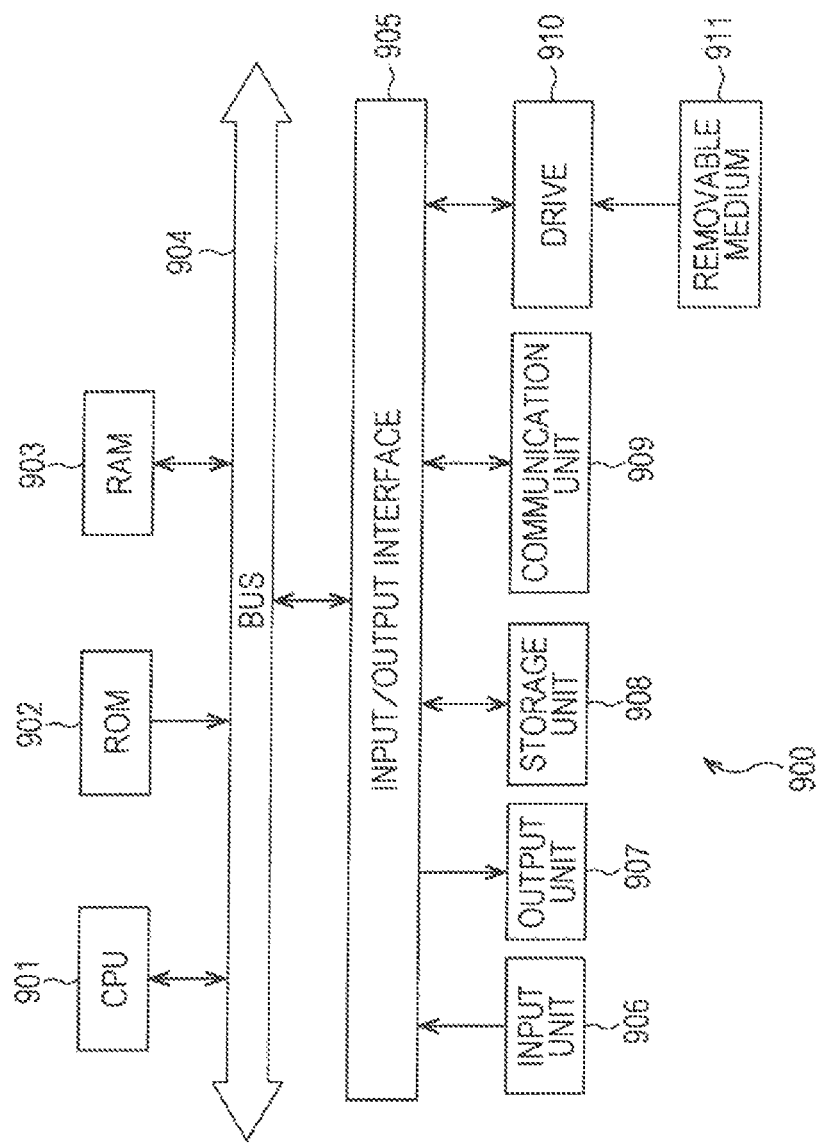
FIG. 28 is a diagram illustrating an exemplary configuration of a computer.

FIG. 28 is a block diagram illustrating an exemplary configuration of hardware of a computer on which the series of processing described above is executed by a program.

In a computer 900, a central processing unit (CPU) 901, a read only memory (ROM) 902, a random access memory (RAM) 903 are interconnected with each other via a bus 904. The bus 904 is further connected with an input/output interface 905. The input/output interface 905 is connected with an input unit 906, an output unit 907, a storage unit 908, a communication unit 909, and a drive 910.

The input unit 906 includes a key board, a mouse, and a microphone. The output unit 907 includes a display and a speaker. The storage unit 908 includes a hardware and a non-volatile memory. The communication unit 909 includes a network interface. The drive 910 drives a removable medium 911 including a magnetic disk, an optical disk, a magneto-optical disk, or a semiconductor memory.

On the computer 900 configured as above, the series of above-described processing is executed by operation such that the CPU 901 loads, for example, a program stored in the storage unit 908 onto the RAM 903 via the input/output interface 905 and the bus 904 and executes the program.

The program executed by the computer 900 (CPU 901) can be stored, for example, in the removable medium 911 as a package medium and be provided. Alternatively, the program can be provided via a wired or wireless transmission medium including a local area network, an Internet, and digital satellite broadcasting.

On the computer 900, the program can be installed in the storage unit 908 via the input/output interface 905, by attaching the removable medium 911 to the drive 910. The program can be received at the communication unit 909 via a wired or wireless transmission medium and be installed in the storage unit 908. Alternatively, the program can be installed in the ROM 902 or the storage unit 908 beforehand.

Note that the program executed by the computer 900 can be a program processed in a time series in an order described in the present description, or can be a program processed in required timing such as being called.

Note that in the present description, processing steps describing a program required for causing the computer 900 to execute various types of processing are not necessarily processed in sequentially in an order described in the flowchart. The processing steps may include steps executed in parallel or individually (for example, parallel processing or processing by objects).

The program can be processed by one computer or can be handled with distributed processing by a plurality of computers. Furthermore, the program can be transferred to a remote computer and be executed.

Furthermore, in the present description, the system represents a set of multiple constituents (devices, modules (parts), or the like). In other words, all the constituents may be in a same housing but they do not have to be in the same housing. Accordingly, a plurality of devices, in separate housings, connected via a network can be a system. A device in which a plurality of modules is housed in one housing can also be a system.

Embodiments of the present technique are not limited to the above-described embodiments but can be modified in a variety of ways within a scope of the present technique. For example, the present technique can be configured as a form of cloud computing in which one function is shared in cooperation for processing among a plurality of devices via a network.

Each of steps described in the above flowcharts can be executed on one device or shared by a plurality of devices for processing. Furthermore, when one step includes a plurality of stages of processing, the plurality of stages of processing included in the one step can be executed on one device or can be shared by a plurality of devices.

The present technique can be configured as follows.

(1)

A reception device including:

a reception unit configured to receive a broadcast wave of digital broadcasting using an internet protocol (IP) transmission scheme; and a processing unit configured to process, on a per-service basis, a particular service and a shared service related to the particular service, among a plurality of services transmitted on the broadcast wave, by using an IP address included in each of packets.

(2)
The reception device according to (1),
wherein each of the services includes one or more components and a first control signal that at least includes information regarding the components, and
a packet of the component and a packet of the first control signal have a same IP address, in a same service.

(3)
The reception device according to (2),
wherein the particular service includes one or more specific components and the first control signal, and
the shared service includes one or more shared components and the first control signal.

(4)
The reception device according to any one of (1) to (3), wherein the processing unit uses an IP address contained in each of packets, and packages constituents of the particular service and constituents of the shared service.

(5)
The reception device according to (4),
wherein a packet of time information used in common by a plurality of services has a particular IP address, and
the processing unit uses the IP address contained in each of the packets and includes the time information in the package.

(6)
The reception device according to (4) or (5),
wherein a packet of an electronic service guide has a particular IP address, and
the processing unit uses the IP address contained in each of the packets and includes the electronic service guide in the package.

(7)
The reception device according to (2),
wherein the first control signal is transmitted at a first layer that is a layer higher than an IP layer, among protocol layers in the IP transmission scheme.

(8)
The reception device according to (7),
wherein the broadcast wave transmits a second control signal at a second layer that is a layer lower than the IP layer, and
the second control signal at least includes an ID to identify a network, an ID to identify a stream, and an ID to identify a service.

(9)
The reception device according to (8),
wherein the second control signal includes information to identify the shared service.

(10)
The reception device according to (2) or (9),
wherein the first control signal includes information to identify the shared service.

(11)
The reception device according to (8) or (9),
wherein the second control signal includes information indicating whether the particular service and the shared service are on the air.

(12)
The reception device according to any one of (8) to (11), wherein the first control signal and the second control signal are stored in a service guide delivery unit (SGDU) container and transmitted.

(13)
A reception method implemented by a reception device, the reception method including:
receiving, by the reception device, a broadcast wave of digital broadcasting that uses an IP transmission scheme; and
processing, by the reception device, on a per-service basis, a particular service and a shared service related to the particular service, among a plurality of services transmitted by the broadcast wave, by using an IP address included in each of packets.

(14)
A transmission device including a transmission unit configured to transmit a particular service and a shared service related to the particular service on a broadcast wave of digital broadcasting using an IP transmission scheme,
wherein the packet that transmits the particular service and the packet that transmits the shared service have a same IP address on a per-service basis.

(15)
The transmission device according to (14) further including a first acquisition unit configured to obtain one or more components, and a second acquisition unit configured to obtain a control signal that includes at least information regarding the component, wherein a packet of the one or more components dial form the particular service or the shared service and a pocket of the control signal have a same IP address on a per-service basis.

(16)
A transmission method implemented by a transmission device, the transmission method including:
transmitting, by the transmission device, a broadcast wave of digital broadcasting using an IP transmission scheme such that a packet that transmits a particular service and a packet that transmits a shared service related to the particular service have a same IP address on a per-service basis.

REFERENCE SIGNS LIST 1 broadcast system
10 transmission device
20 reception device
111 video data acquisition unit
113 audio data acquisition unit
117 control signal acquisition unit
119 file data acquisition unit
121 Mux
122 transmission unit
212 tuner
213 Demux
214 clock generator
215 video decoder
216 video output unit
217 audio decoder
218 audio output unit
219 closed caption decoder
220 FLUTE processing unit
221 storage
222 control signal processing unit
223 NVRAM
224 service package unit
225 communication I/F
226 browser
251 BBP filter
252 IP filter
253 UDP filter 254 LCT filter
255 SGDU filter bank
900 computer
901 CPU

The invention claimed is:

1. A reception device comprising:
a receiver that receives digital broadcasting using an internet protocol (IP) transmission scheme; and
a processor that processes on a per-service basis, a particular service and a shared service related to the particular service, among a plurality of services transmitted on the digital broadcasting, by using a first 1P address included in each packet of the particular service and a second IP address different from the first IP address included in each packet of the shared service,
wherein the particular service includes one or more components and a first control signal, packets of the one or more components and packets of the first control signal include the first IP address, and the first control signal includes information of the one or more components of the particular service and of one or more components of the shared service.

2. The reception device according to claim 1,
wherein the particular service includes one or more specific components and the first control signal, and
the shared service includes one or more shared components and the first control signal.

3. The reception device according to claim 2,
wherein the processor uses an IP address contained in each of the packets, and packages constituents of the particular service and constituents of the shared service.

4. The reception device according to claim 3,
wherein a packet time information used in common by plurality of services has a particular IP address, and
the processor uses the IP address contained in each of the packets and includes the time information in each package.

5. The reception device according to claim 3,
wherein a packet of an electronic service guide has a particular IP address, and
the processor uses the IP address contained in each of the packets and includes the electronic service guide in each package.

6. The reception device according to claim 1,
wherein the first control signal is transmitted at a first layer that is a layer higher than an IP layer, among protocol layers in the IP transmission scheme.

7. The reception device according to claim 6,
wherein the digital broadcasting transmits a second control signal at a second layer that is a layer lower than the IP layer, and
the second control signal at least includes an ID to identify a network, an ID to identify a stream, and an ID to identify a service.

8. The reception device according to claim 7,
wherein the second control signal includes information to identify the shared service.

9. The reception device according to claim 8,
wherein the first control signal includes information to identify the shared service.

10. The reception device according to claim 7,
wherein the second control signal includes information indicating whether the particular service and the shared service are on the air.

11. The reception device according to claim 7,
wherein the first control signal and the second control signal are received in a service guide delivery unit (SGDU) container.

12. A reception method implemented by a reception device, the reception method comprising:
receiving, by the reception device, digital broadcasting that uses an IP transmission scheme, and
processing, by the reception device, on a per-service basis, a particular service and a shared service related to the particular service, among a plurality of services transmitted by the digital broadcasting, by using a first IP address included in each packet of the particular service and a second IP address different from the first IP address included in each packet of the shared service,
wherein the particular service includes one or more components and a first control signal, packets of the one or more components and packets of the first control signal include the first IP address, and the first control signal includes information of the one or more components of the particular service and of one or more components of the shared service.

13. The reception method according to claim 12, further comprising:
packaging constituents of the particular service and constituents of the shared service using the first and second IP addresses into a package.

14. The reception method according to claim 13, further comprising:
including an electronic service guide in the package, wherein a packet of the electronic service guide has a particular IP address.

15. The reception method according to claim 12, further comprising:
receiving the first control signal in the digital broadcasting at a first layer that is a layer higher than an IP layer, among protocol layers in the IP transmission scheme.

16. The reception method according to claim 15, further comprising:
receiving a second control signal in the digital broadcasting at a second layer that is a layer lower than the IP layer, the second control signal at least including an identifier to identify a network, an identifier to identify a stream, and an identifier to identify a service.

17. The reception method according to claim 12, wherein the first control signal includes information to identify the shared service.

18. A transmission device including a transmitter that transmits a particular service and a shared service related to the particular service on digital broadcasting using an IP transmission scheme,
wherein each packet of the particular service has a first IP address and each packet of the shared service has a second IP address different from the first IP address, on a per-service basis, and
the particular service includes one or more components and a first control signal, packets of the one or more components and packets of the first control signal include the first IP address, and the first control signal includes information of the one or more components of the particular service and of one or more components of the shared service.

19. The transmission device according to claim 18, further comprising:
a processor that obtains one or more components; and
a control signal that at least includes information regarding the one or more components, wherein a packet of the one or more components that form the particular service or the shared service and a packet of the control signal have a same IP address on a per-service basis.

20. A transmission method implemented by a transmission device, the transmission method comprising:
    transmitting, by the transmission device, digital broadcasting using an IP transmission scheme such that each packet of a particular service has a first IP address and each packet of a shared service related to the particular service has a second IP address different from the first IP address on a per-service basis,
    wherein the particular service includes one or more components and a first control signal, packets of the one or more components and packets of the first control signal include the first IP address, and the first control signal includes information of the one or more components of the particular service and of one or more components of the shared service.

* * * * *

UNITED STATES PATENT AND TRADEMARK OFFICE
CERTIFICATE OF CORRECTION

PATENT NO. : 9,998,798 B2  
APPLICATION NO. : 15/023500  
DATED : June 12, 2018  
INVENTOR(S) : Naohisa Kitazato Page 1 of 1

It is certified that error appears in the above-identified patent and that said Letters Patent is hereby corrected as shown below:

In the Claims

Column 29, Line 14, after the word "first", delete "1" and replace with --I--.

Signed and Sealed this  
Ninth Day of July, 2019

Andrei Iancu  
*Director of the United States Patent and Trademark Office*